United States Patent
Petersson et al.

(10) Patent No.: US 7,016,320 B1
(45) Date of Patent: Mar. 21, 2006

(54) SUBSCRIBER STATION, NETWORK CONTROL MEANS AND METHOD FOR CARRYING OUT INTER-FREQUENCY MEASUREMENTS IN A MOBILE COMMUNICATION SYSTEM

(75) Inventors: Justus Petersson, Maxplatz (DE); Anders Näsman, Södra Langgatan (DE); Walter Müller, Huginvägen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 908 days.

(21) Appl. No.: 09/643,653

(22) Filed: Aug. 21, 2000

(30) Foreign Application Priority Data

Aug. 31, 1999 (EP) ................................ 99 117 129

(51) Int. Cl.
*H04Q 7/00* (2006.01)
(52) U.S. Cl. ...................... 370/331; 370/332; 455/436; 455/442
(58) Field of Classification Search ................ 370/331, 370/248, 249, 250, 251, 252, 253, 328, 329, 370/330, 332, 334, 339, 343, 344, 346, 350, 370/317, 318, 320, 333, 335, 342, 437, 441, 370/436, 439, 442; 455/436–444
See application file for complete search history.

(56) References Cited

U.S. PATENT DOCUMENTS

| | | |
|---|---|---|
| 5,267,261 A | 11/1993 | Blakeney, II et al. |
| 5,404,355 A | 4/1995 | Raith |
| 5,487,174 A | 1/1996 | Persson |
| 5,533,014 A | 7/1996 | Willars et al. |
| 5,574,728 A | 11/1996 | Mamaghani et al. |
| 5,594,718 A | 1/1997 | Weaver, Jr. et al. |
| 5,596,315 A | 1/1997 | Olds et al. |
| 5,634,192 A | 5/1997 | Meche et al. |
| 5,640,414 A | 6/1997 | Blakeney, II et al. |
| 5,673,259 A | 9/1997 | Quick |
| 5,697,055 A | 12/1997 | Gilhousen et al. |

(Continued)

FOREIGN PATENT DOCUMENTS

EP 0 715 423 A 6/1996

(Continued)

OTHER PUBLICATIONS

U.S. Appl. No. 09/314,019, filed May 19, 1999, entitled "Mobile Station Measurments With Event-Based Reporting".

(Continued)

*Primary Examiner*—Phirin Sam
(74) *Attorney, Agent, or Firm*—Nixon & Vanderhye, P.C.

(57) ABSTRACT

In a mobile communication system (T1) a time interval selection means (TISM) in a network control means (RNC) determines a time interval and sends an indication about this time interval to a subscriber station (MS) in a time interval indication signal. A time interval signal determining means (TISDM) in the subscriber station (MS) detects the time interval and an IF measurement means (IFMM) carries out inter-frequency/inter-system measurements in the detected time interval specified by the network control means (RNC). In this time interval the temporary reduction of the quality of service QoS on the communication connection (CC) is planed by the network control means (RNC). However, independent as to whether a delay-sensitive or loss-sensitive data transmission is carried out, the network control means (RNC) can make provisions in order to compensate the temporary reduction of the quality of service. Such procedure is superior to performing IF measurements in an idle time interval of a compressed time slot in which a temporary degradation of the quality of service must always be accepted due to a compressed mode of operation.

60 Claims, 11 Drawing Sheets

U.S. PATENT DOCUMENTS

| | | | |
|---|---|---|---|
| 5,778,316 A | 7/1998 | Turcotte et al. | |
| 5,848,063 A | 12/1998 | Weaver, Jr. et al. | |
| 5,870,673 A | 2/1999 | Haartsen | |
| 5,896,368 A | 4/1999 | Dahlman et al. | |
| 6,002,940 A | 12/1999 | Richter | |
| 6,006,077 A | 12/1999 | Shull | |
| 6,212,368 B1 * | 4/2001 | Ramesh et al. | 455/277.2 |
| 6,507,570 B1 * | 1/2003 | Holma et al. | 370/333 |
| 6,574,456 B1 * | 6/2003 | Hamabe | 455/63.3 |
| 6,845,238 B1 * | 1/2005 | Muller | 455/436 |
| 2002/0093922 A1 * | 7/2002 | Grilli et al. | 370/328 |
| 2003/0194033 A1 * | 10/2003 | Tiedemann et al. | 375/354 |

FOREIGN PATENT DOCUMENTS

| | | |
|---|---|---|
| EP | 0 853 393 A | 7/1998 |
| EP | 0 854 588 A | 7/1998 |
| WO | WO 98 28931 A | 7/1992 |
| WO | WO 98 43455 A | 10/1998 |
| WO | WO 98 58461 A | 12/1998 |
| WO | WO 99 43177 A | 8/1999 |
| WO | WO 99 43178 A | 8/1999 |

OTHER PUBLICATIONS

U.S. Appl. No. 09/344,122, filed Jun. 24, 1999, entitled "Network-Evaluated Handover Assisted By Both Mobile and Base-Stations".

U.S. Appl. No. 09/344,121, filed Jun. 24, 1999, entitled "Power Control Based On Combined Quality Estimates".

U.S. Appl. No. 09/262,346, filed Mar. 4, 1999, entitled "Coordinating Different Types of Messages Sent To Mobile Radios In A Mobile Communications System".

U.S. Appl. No. 09/545,872, filed Apr. 6, 2000, entitled "Inter-Frequency Measurement and Handover for Wireless Communications".

Gustafsson et al, "Compressed Mode Techniques for Inter-Frequency Measurements in a Wide-band DS-CDMA System", Waves of the Year 2000+ PIMRC '97, the 8$^{th}$ IEEE Int'l. symposium on Personal, Indoor and Mobile Radio Communications Technical Program, Proceedings, Helsinki, FI, Sep. 1-4, 1997, pp. 231-235.

Technical Specification, 3$^{rd}$ Generation Partnership Project (3GPP), Technical Specification Group (TSG), Radio Access Network (RAN), Working Group 1 (WG1), Physical Layer—Measurements, TS 25.231 VO 3.0 (Jun. 1999).

Technical Specification, 3$^{rd}$ Generation Partnership Project (3GPP), Technical Specification Group (TSG), Radio Access Network (RAN), Working Group 1 (WG1), Physical Layer—General Description, TS 25.201 VO 2.1.0 (Jun. 1999).

Technical Specification, 3$^{rd}$ Generation Partnership Project (3GPP), Technical Specification Group (TSG), Radio Access Network (RAN), Working Group 1 (WG1), Physical Layer Procedures, TS 25.214 VO 1.1.0 (Jun. 1999).

* cited by examiner

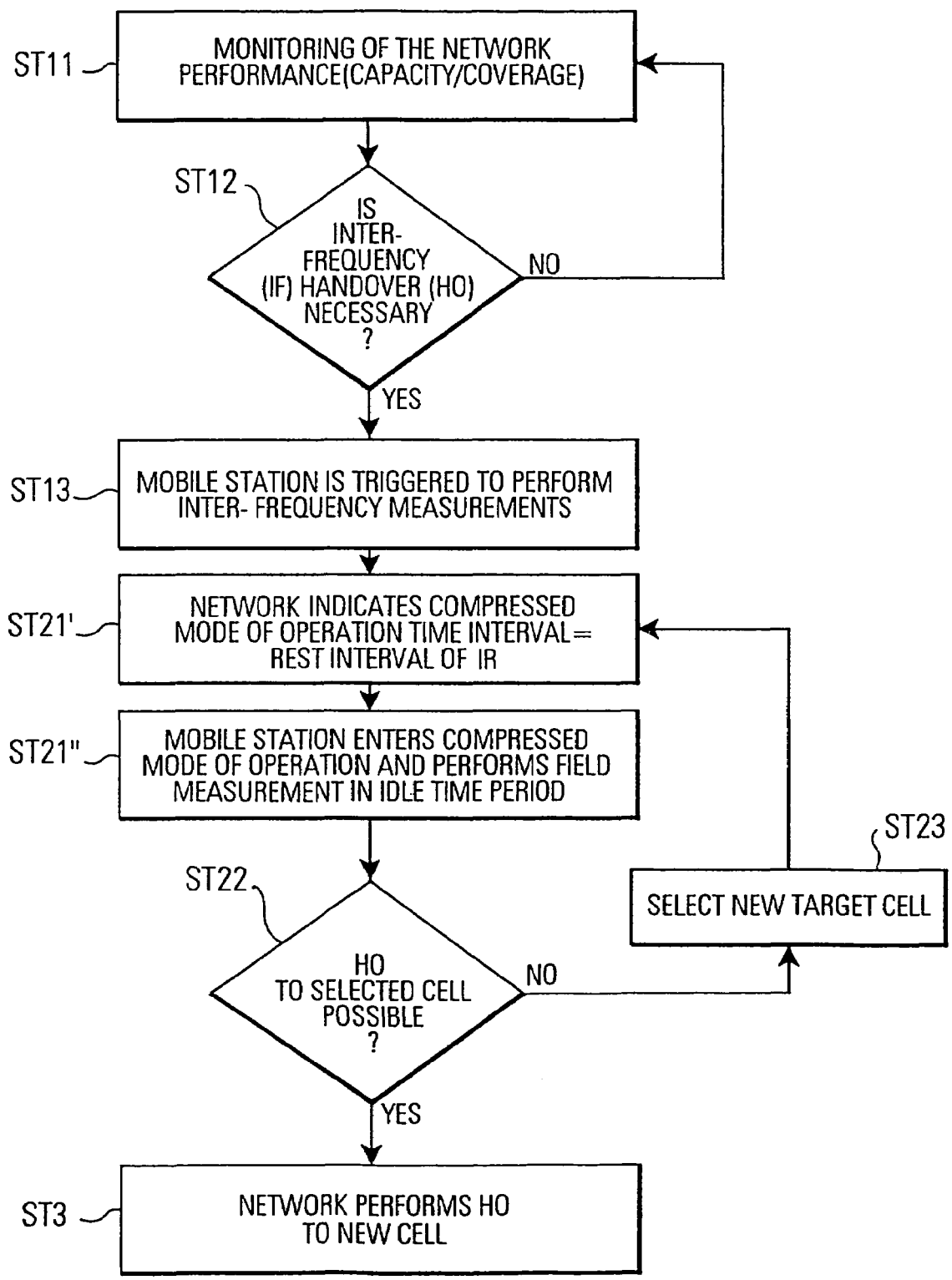

PRINCIPLE OF THE INVENTION

SUBSCRIBER STATION, NETWORK CONTROL MEANS AND METHOD FOR CARRYING OUT INTER-FREQUENCY MEASUREMENTS IN A MOBILE COMMUNICATION SYSTEM

FIELD OF THE INVENTION

The invention relates to a subscriber station, a network control means and a method for carrying out inter-frequency measurements in a mobile communication system. The invention also relates to a mobile communication system in which such a subscriber station, such a network control means and such a method are employed.

As will be explained with more details below, in a mobile communication system transmission conditions on a connection (communication connection or signaling connection) between a subscriber station and a base transmission station are monitored and the need for an inter-frequency or inter-system handover is detected, e.g. when the transmission conditions deteriorate. When the need for an inter-frequency or inter-system handover is detected, an inter-frequency measurement trigger signal is generated to indicate the need for an inter-frequency or inter-system handover and to initiate inter-frequency measurements on a different frequency than currently used. In response to the trigger signal inter-frequency measurements are carried-out on one or more different frequencies and if a suitable new frequency has been found an actual inter-frequency or inter-system handover takes place. Hereinafter, the term "handover" is used to designate an inter-frequency handover or an inter-system handover, even if not explicitly stated.

When a connection is established between the base transceiver station and the subscriber station, even if only a signaling connection is established with the subscriber station being in an active-mode of operation, there always exists some data traffic on the connection and the subscriber station and the network must carry out inter-frequency measurements when no data is transmitted, since otherwise some of the communicated data on the connection will be lost. Another important aspect is when and how the inter-frequency measurement trigger signal should be generated by the network to initiate the inter-frequency measurements. It should be noted that the inter-frequency measurements themselves are, however, always carried out in the subscriber station in response to the inter-frequency measurement trigger signal.

The present invention in particular addresses the problem which time interval should be used in the subscriber station for carrying-out these inter-frequency measurements.

Hereinafter inter-frequency will be abbreviated with "IF".

BACKGROUND OF THE INVENTION

With respect to a conventional method for triggering IF measurements in a mobile communication system, FIG. 1 shows a general overview of a telecommunication system TELE which comprises at least two different mobile communication systems T1, T2. A subscriber station, e.g. a mobile station MS, which is operable in the first mobile communication system T1, may also be operable in the second mobile communication system T2. Within each mobile communication system T1, T2 the mobile station MS can move around different cells S1, S2, S3, S1', S3' and C1–C6. Due to different handover criteria the mobile station MS may perform an inter-frequency handover within the same system or an inter-system handover to/from the other system. It should be noted that the present invention is equally well applicable for triggering an inter-frequency handover within the same system and/or an inter-system handover and FIG. 1 only shows two mobile communication systems T1, T2 as an example where both such handover procedures may take place.

FIG. 1 shows as an example for the first mobile communication system T1 a WCDMA (Wideband Code Division Multiple Access) or CDMA (Code Division Multiple Access) communication system comprising a network control means RNC (Radio Network Controller), at least one base transceiver station RBS, RBS' (in WCDMA called radio base station), at least one subscriber station MS (Mobile Station) as well as a number of (possibly) overlapping cells S1, S2, S3, S1', S3'.

An example for the second mobile communication system T2 is a communication system according to the GSM (Global System for Mobile Communications), PDC (Personal Digital Cellular) and D-AMPS (Digital-Advanced Mobile Personal Service) standards.

In FIG. 1 an example of a GSM system is shown for the second mobile communication system T2. However, it should be noted that the invention can in principle be applied to any type of digital mobile telephone system and is as such not restricted to the aforementioned systems. The GSM system shown in FIG. 1 comprises the conventional units of a base station controller BSC, at least one mobile switching center MSC as well as a gateway mobile switching center GMSC. The mobile stations MS are served by a plurality of base transceiver stations BTS within the cells C1–C6 in which the mobile station MS can move around.

The network control means RNC of the WCDMA system in FIG. 1 is connected via a UMSC unit to the gateway mobile switching center GMSC of the GSM system.

Depending on the geographical layout of the first and second mobile communication systems T1, T2 the cells S1, S2, S3, S1', S3' of the first mobile communication system T1 may also completely or partially overlap with the cells C1–C6 of the second mobile communication system T2. Of course, if the mobile station MS is to carry out an inter-system handover—then the mobile station MS will be able to operate according to the specifications of the first and the second mobile communication system.

One reason for performing inter-frequency or inter-system handovers in the telecommunication system TELE in FIG. 1 may be due to coverage reasons. This is due to the fact that neither the first communication system nor any other system has a complete coverage in all geographical areas, e.g. hot spots in UMTS. Furthermore, some cells within the mobile communication system may operate on frequencies which are not applicable in adjacent cells. Therefore, by letting the mobile station MS or the network control means RNC perform either an inter-frequency handover of an inter-system handover, the mobile station MS can be used in a larger area without interruptions in the communication.

Another reason for the handover may be capacity reasons. Either the mobile communication system or other mobile communication systems may become heavily loaded at times, so that an inter-system handover may be required. Analogously, the mobile station MS may have established a connection on a particular frequency and it may be necessary that another frequency is to be used. This other frequency may be present within the same cell or in another cell and both are generally termed inter-frequency handover. As indicated in FIG. 1, the inter-frequency measurements (necessary for an inter-frequency handover/or an inter-system handover) is always carried-out by an inter-frequency measurement means IFMM situated in a mobile station MS.

The network control means RNC comprises a paging flag sending means PFSM for sending a paging flag to the mobile station MS when a signaling communication link has already been established between the subscriber station MS and the network. For example, when the mobile station MS has been switched on and has been registered in the network, the subscriber station is in a registered and non-active mode of operation. A standby operation means SOM holds the subscriber station in such a non-active mode of operation. In such a non-active mode of operation the operation of the subscriber station MS is invoked by receiving the paging flag PF from the network control means RNC, namely when a call is pending for the subscriber station MS and when a communication connection is to be set up to the subscriber station MS.

FIG. 2 shows a general flow chart of a method for carrying-out an inter-frequency or inter-system handover in a mobile communication system when a signaling connection or a communication connection is set up. In step ST11 a handover means HORM (HandOveR Means) situated in the network control means RNC or the mobile station MS monitors the network performance regarding the capacity/coverage aspects as explained above. In step ST12 the handover means HORM decides whether in principle a handover is necessary according to the criteria determined in step ST11. If so ("Y" in step ST12), the mobile station is triggered to perform inter-frequency measurements in step ST13. More particularly, in step ST13 an IF measurement trigger signal is outputted by the handover means HORM. As indicated in FIG. 1, the IF-measurements means IFMM can be triggered by a mobile-evaluated-handover trigger signal or a network-evaluated-handover trigger signal IFTS in step ST13.

In order to perform a fast and reliable inter-frequency handover when there is the need for such a handover, it is advantageous to provide the outputting of a reliable trigger signal IFTS in either the network control means RNC and/or in the mobile station MS. Of course, in order to provide a well-designed trigger procedure, there is not a single triggering condition that needs to be monitored in step ST11 and which will eventually trigger the mobile station MS to perform IF-measurements on other frequencies or systems. Usually, a couple of conditions are monitored in step ST11 and must be fulfilled that the trigger signal is outputted in step ST13. Such conditions may for example comprise an excessively high output power from either the down-link (network to subscriber station) connection or the up-link (subscriber station to network) connection and/or a high load in the cell. If for example the network detects by measuring the uplink-interference a high load in the cell, it will attempt to trigger IF-measurements and thus a handover to a different cell or a different system. Likewise, if transmission conditions deteriorate, the mobile station MS is triggered to more and more increase its output power and therefore a high output power also indicates the need for IF-measurements and thus the need for a handover.

The prior art reference TS 25 231 V0.3.0, technical specification: Third Generation Partnership Project (3GPP); Technical specification group (TSG), radio access network (RAN); working group 1 (WG 1); Physical Layer-Measurements in the IS 95 standard, dated June 1999 (hereinafter referred to as reference [1]) describes in particular in chapters 3., 4., 5.1.2 a number of conventional measurement trigger criteria. In the mobile communication system described in reference [1] both a network handover means HORM and a subscriber station handover means HORM monitor the performance of the radio-link (RL) and can request a handover. For example, the network handover means HORM monitors the down-link by measurement reports from the subscriber station MS. The network handover means HORM also monitors the traffic load. As explained above, a hand-over evaluated by a mobile station MS is called a mobile-evaluated hand-over, abbreviated MEHO. A hand-over evaluated by the network is called a network-evaluated hand-over, abbreviated NEHO. As indicated in FIG. 1, since the mobile station MS and the network control means RNC each comprises a handover HORM each can initiate a handover according to the triggering conditions which are respectively monitored. The four basic criteria during the monitoring in step ST11 in the prior art are the "base station traffic load exceeded" condition, the "distance limits exceeded" condition, the "pilot strength below a predetermined threshold" condition and the "power level exceeded" condition as will be explained below and as is described in the aforementioned reference [1].

Firstly, regarding the condition "base station traffic load exceeded", the network handover means HORM determines the necessity for a handover by monitoring loads at all base stations BS in the mobile communication system T1 and outputs the IF measurement trigger signal IFTS in order to balance loads between all base stations, in order to achieve a higher traffic efficiency. For example, the network handover means HORM outputs the trigger signal in step ST13 whenever the load at a base station exceeds a predetermined load threshold.

Secondly, regarding the condition "distance limits exceeded" the subscriber handover means and/or the network handover means HOM are adapted to determine the necessity for the handover on the basis of a supervision of the distance between a base station BS and the subscriber station MS. The distance between the relevant base station and the subscriber station can be determined in a synchronized system. Therefore, the trigger signal IFTS is outputted in step ST13 whenever the measured distance exceeds a predetermined distance.

Thirdly, regarding the condition "pilot strength below a predetermined threshold", the subscriber handover means and/or the network handover means are adapted to determine the necessity for a handover on the basis of a supervision of a measured pilot signal strength falling below a predetermined power threshold. As is illustrated in FIG. 3-1 and in FIG. 4-1, in modern mobile communication systems a data transmission between a base transceiver station RBS and a subscriber station MS is carried-out by transmitting data, frames FR and the transmission frames FR consist of a control portion CP and a data portion DP. This is true for CDMA frames (FIG. 3-1) and TDMA frames in GSM (FIG. 4-1) The control portion CP consists of at least of pilot symbols and preferably also of other control symbols CS. For example, each base station BS may transmit a pilot signal of constant power on the same frequency. The subscriber station MS can monitor the received power level of the received pilot signal and can thus estimate the power loss on the connection between the base station BS and the subscriber station MS. Using the pilot signal strength for estimating the path loss, the subscriber handover means HORM outputs the trigger signal IFTS in step ST13 if the path loss is greater than a predetermined path loss threshold.

Fourthly, regarding the condition "power level exceeded" the subscriber handover means and/or the network handover means are adapted to determine the necessity for a handover on the basis of a supervision that in response to a power increase commanded by a base station BS a subscriber power adjustment module PAN (shown in FIG. 1 in the mobile station MS) is unable to further increase its power on the up-link of the communication connection CC.

FIGS. 5a–d show such a conventional adjustment of the transmission power when exchanging frames FR consisting of a number of time slots TS1 . . . TS15 between a base transceiver station (generally called node "B") RBS and a subscriber station MS. A power adjustment module PAM in the base transceiver station (node "B") RBS presets an upper threshold PUP, a lower threshold PDWN and an offset value POFF for the power. The power offset value POFF is used in connection with a slow power control and the upper and lower threshold values PUP, PDWN are used in connection with a fast power control in the node B.

The slower power control and the fast power control as illustrated in FIG. 5b is carried out according to the flow chart in FIG. 5c. Steps P1, P2 relate to the slow power control (the outer control loop) carried out on the RNC-side or the MS-side. In step P1 the frame error rate FER (or the block error rate BLER) is measured and in step P2 the measured FER (or the BLER) is compared with a FER target value (or a BLER target value). In step P8 a new signal interference ratio target value SIR-target is obtained. As shown in FIG. 5d, a known (simulated) relationship between a delta_SIR_target value (dB) and the logarithm of the measured FER value exists. Between two threshold values UL_delta_SIR_2 and UL_delta_SIR_1 a predetermined "working area" exists. This relationship is known, i.e. simulated beforehand. As indicated in FIG. 5d, depending on the measured value log (measured FER) a value delta_SIR_target* is read out. A new SIR_target value SIR_target is calculated according to the following equation:

$$SIR\_target = SIR\_target + delta\_SIR\_target*$$

Thus, the outer loop or slow power control will generate in step P8 new SIR-target values whenever steps P1, P2 are executed. The new SIR-target value is then used in the fast power control (inner loop) carried out on the node B-side or the MS-side, respectively.

In step P5 the SIR (Signal-to-Interference ratio) per slot is measured and in step P4 the measured SIR value is compared with the (current) SIR-target value as obtained in step P8. If the measured SIR value is greater than the current SIR-target value, then a decrease command is sent to the mobile station MS/network, i.e. the transmission power control parameter TPC is set to TPC="00" in step P7. When the measured SIR value is smaller then the (current) SIR-target value in step P4, then an increase command is sent to the mobile station MS/network in step P6 by setting the transmission power control parameter TPC to TPC="11".

As illustrated in FIG. 5b, the slow power control and the fast power control result in a stepwise adjustment of the power $P_{out}$ on the downlink DL. Since the slow power control performs steps P1, P2 for calculating the frame error rate FER (or block error rate BLER) for every frame (or block) a new SIR-target value is obtained less frequently than the fast power control carried out with steps P5, P4, P6, P7 for each slot.

The offset value $P_{off}$ and the upper and lower threshold values $P_{up}$, $P_{dwn}$ are also used in the power adjustment. For example, when the output power $P_{out}$ exceeds the upper threshold $P_{up}$ then the offset value $P_{off}$ is slightly increased and when the power is lower than the lower threshold $P_{dwn}$ the offset value $P_{off}$ is slightly decreased. The stepwise adjustment of the power is always performed within the power range between $P_{dbn}$ and $P_{up}$. Since the values $P_{off}$, $P_{up}$ and $P_{dwn}$ are only used for the triggering of a soft-handover, they are not of any further relevance for the present invention and any further descriptions thereof are therefore omitted.

As explained above, in the fourth condition "power level exceeded" the node B (the base station BS) commands the subscriber station MS to increase its power and if the power adjustment module PAM in the node B notices that there is no further increase of power in response to a power increase command TCP, the network handover means HORM may request a measurement by issuing the IF trigger signal.

Regarding the above described four different conditions, there are a number of significant disadvantages and some of the four described conditions can not even be implemented in future wideband code division multiple access systems (WCDMA).

Whilst reference [1] relates to the IS-95 standard and describes a synchronized CDMA system, reference [2]: TS 25.201 V2.1.0, a third generation partnership project (3GPP); technical specification group (TSG); radio access network (RAN; working group 1 (WG1); physical layer-general description, dated June 1999, describes a non-synchronized WCDMA system, in particular the multiple access used therein. In a synchronized system like the one described in reference [1] either the base station BS or the subscriber station MS can still estimate the distance between them (second trigger condition). This is possible since the chip rate on the pilot channel and all channels are synchronized (locked) to a precise system clock. This is in reference [1] accomplished by using a global positioning system (GPS). However, due to multipath propagation delay and shadowing between the base station BS and the subscriber station MS, the estimated distance may be erroneous. Therefore, the second condition "distance limits exceeded" may not be very accurate.

In condition 3 "pilot strength below a predetermined threshold" the subscriber station MS must perform measurements for triggering IF measurements and thus for triggering a handover. These continuous measurements of the pilot signal strength may drastically reduce the lifetime of the battery of the subscribers station, since the subscriber station MS must perform an average filtering of the pilot channel during a predetermined measurement time. The decrease of the lifetime of the battery is to be avoided in all circumstances, since there are already a lot of measurements that must be performed by the subscriber station, e.g. the IF measurements on other frequencies when the IF measurement trigger signal IFTS has been issued. Furthermore, the subscriber station MS has to report the pilot signal strength measurements in some form over the air-interface to the base transceiver station RBS (node B) and to the network control means RNC and this will additionally increase the interference level on the up-link UL as well as the signaling load in the network. Therefore, a load estimation according to the first condition "base station traffic load" when used in connection with the third condition "pilot strength below a predetermined threshold" may cause more signaling due to the increased signaling in an air interface of the network.

Therefore, the major disadvantage of the prior art trigger mechanisms is that some of the conditions cannot be used in synchronized or non-synchronized systems, that the lifetime of the battery is reduced and that the interference level on the up-link UL as well as the signaling load in the network is increased.

Returning to FIG. 2, in response to an IF measurement trigger signal IFTS (generated by the subscriber handover means HORM or the network handover means HORM), the subscriber station will perform IF measurements in a given time interval in step ST21. As explained above, in order to perform a fast and reliable inter-frequency handover, it is advantageous to let the subscriber station MS perform signal quality measurements on a different frequency, e.g. in a target cell or in a different system, and to report these to the network control means RNC, such that the network control means RNC can base its handover decisions, as to which cell the subscriber station MS is to be handed over, on these reported signal quality measurements. As explained below, the performing of IF-measurements in the subscriber station MS is not a trivial task. For example, in CDMA and FDMA systems the receiver of the subscriber station MS is normally busy receiving information on the current frequency and thus some measurement time has to be created in some way in such systems in order to allow inter-frequency measurements without a drastic loss of data. Conventional methods for determining a time interval in which field measurements are carried out will be described below as reference to FIGS. 3-1, 3-2, FIGS. 4-1, 4-2 and FIG. 6.

As already discussed above with reference to FIG. 3-1, in a CDMA communication system the data communication is performed by exchanging data frames FR consisting of a plurality of time slots TS1 . . . TS15. Each time slot comprises a control portion CP and a data portion DP. As described in the aforementioned reference [2] and as also indicated with step ST21' in FIG. 3-2 and in FIG. 3-1, it also possible to carry out the data transmission in a compressed mode (also called slotted mode) in order to create some time for the IF measurement. For this purpose the network control means RNC comprises a compressed mode setting means CMSM in which the data contained in the data portion DP is compressed, i.e. concentrated to a smaller part of the frame, resulting in an idle time portion ITP. The subscriber station MS comprises a compressed mode determining means CMDM which determines i.e. realizes—being informed about the compressed mode of transmission via signaling or some information sent from the compressed mode setting means CMSM of the network control means RNC—the compressed mode of operation. If such a compressed mode of operation is detected, the subscriber station MS enters a compressed mode of operation and performs the IF measurements in the idle time IT in step 5T21" in FIG. 3-2.

In a CDMA system such a concentration of information is achieved by reducing the processing gain G=chips/information bits=1/SF, e.g. by decreasing the spreading factor SF. Another possibility how the concentration of information can be achieved is by changing the channel coding scheme, e.g. from r=⅓ to r=½. Due to the compressed mode of operation a time interval TI is generated in which the IF measurements can be carried out by the IF measurement means IFMM in the subscribed station MS.

FIG. 4-1 and steps SC21'" and ST21"" show another possibility of how a time interval can be provided in which the field measurements can be carried out. In a GSM system, a specific time slot FMS of a frame consisting of a plurality of TDMA time slots TS1 . . . TS-M is specified and the field measurements are carried-out in the portion FMP. That is, in a GSM system a predetermined field measurement slot is provided in which no data is sent from the network control means or the base station transmitter to the subscriber station MS.

A further approach how an idle time interval can be provided is described in reference [1] for the case when an inter-system handover should be carried-out. In this case, as illustrated in FIG. 6, the subscriber station MS does not perform any measurements on another system and instead the other system transmits a pseudo-noise PN sequence which is received by the subscriber station MS on the same frequency on which the subscriber station MS already communicates. When the power of this PN sequence exceeds a predetermined threshold during a predetermined time, compared to other PN sequences, an inter-system handover is carried-out.

As shown in FIG. 2 and in FIGS. 3-1, 4-1, the network control means RNC triggers the mobile station and step ST13 to perform the IF measurements and it will also indicate to the subscriber station MS on which frequency belonging to a different cell or a different system said IF measurements are to be carried-out. The subscriber station SS will report the IF measurements back to the network control means RNC within a predetermined time. Then, in step ST22, the network control means RNC will determine whether a handover to the selected frequency (cell or different system) is possible. If it is not possible, because for example a too high interference is detected on the new frequency, the network control means selects a new target cell (frequency) in step ST23 and the IF measurements are repeated by the subscriber station MS in step ST21. Furthermore, the network control means RNC can order the subscriber station MS to perform a periodic search or a single search. Such a procedure is for example described in reference [1] for a synchronized communication system.

In some systems like CDMA 2000 the subscriber station MS not only reports the IF measurements back to the network control means, but it also indicates to the network control means RNC how long (time-wise) and when (the starting time) the subscriber station MS will be able for performing the desired IF measurements. If the network control means RNC has knowledge of the time-interval in which the subscriber station MS intends to perform the IF measurements, then the network control means RNC can make some provisions to compensate for data frames, which would be sent by the network control means RNC, but which the subscriber station MS would not process in the time interval in which it performs the IF measurements. That is, actually data frames will get lost in the time period in which the subscriber MS performs the field measurements unless further provisions are made.

One possibility is that the network control means RNC increases the power before or after the measurement time interval or the intervals. Since the error rate is always evaluated over a plurality of data frames, such an increase of power before and after the measurement time interval enables to keep the overall quality for error rate to an average level which will not exceed the requirements of an average error rate. On the other hand, a similar situation occurs on the side of the subscriber station MS, i.e. it will not be possible for the subscriber station MS to transmit data frames in the measurement time interval. Therefore, also the subscriber station MS may compensate possible unsent frames by increasing the power before and after the determined measurement time interval. Therefore, on the side of the subscriber station MS and on the side of the network control means RNC the quality of the received is increased. However, the above described procedures (which are generally used in CDMA 2000 and IS'95) for providing a given time interval in which the mobile station MS is to carry-out field measurements in step ST21, the PN sequence transmission and the compensation for erased frames by increasing the power, still exhibit some major drawbacks when implemented in the system as explained below.

In addition, the WCDMA procedure of carrying-out field measurements in connection with the compressed mode of operation has the following disadvantages, in particular for the system. If the spreading factor SF in the down link DL is reduced to provide the idle time interval IT in which the subscriber station MS is to perform the field measurements on other systems, the available channelization codes are reduced. That is, the hard capacity for the CDMA system is decreased.

On the other hand, if the channel coding rate is increased for a certain time period, a complicated code-rate apparatus must be implemented in the network control means RNC, since a CDMA system can carry services with different coding schemes and different interleaving depths on the same radio link.

Furthermore, the subscriber station MS has to increase its output power when measurements are performed due to the compressed mode operation, since the same data information is transmitted during a smaller time period, i.e. in the compressed data period. If the output power of the subscriber station MS and/or base transceiver station RBS would not be increased, the performance will be decreased. However, this requirement to increase the peak power of the subscriber station MS may imply a distance limitation if the subscriber station MS is already transmitting at its maximum output power. Furthermore, there is a higher risk to lose information, since the data field is not protected to the same extent when the coding rate is reduced. Therefore, on the one hand the compressed data transmission reduces the quality and on the other hand the idle time interval is quite short such that a long time is needed for carrying out the IF measurements and thus handover may be slow.

The procedure to use a PN sequence transmission as shown in FIG. 6 has the following disadvantages. In this case, all other existing mobile communication systems have to be equipped with an apparatus which transmits a PN sequence which can be detected by the subscriber station MS. This will imply high costs for the operators (and thus for the end users). Moreover, the PN sequence used in the other mobile communication systems will interfere with the CDMA systems and will reduce the capacity as well as the quality of data transmission.

The last mentioned method of increasing the power before and after the measurement time interval has the disadvantage that there is a high risk that a loss of frames due to the measurement time interval will deteriorate the speech quality in situations where speech quality is already very low, when it is likely that the subscriber station MS wants to do an inter-frequency handover close to a cell border or when the cell (sector) exhibits a high load.

A measurement time interval can be determined by the subscriber stations as the time in which no data transmission takes place from the network control means. Thus, the IF measurements cannot cause a reduction of the quality of the connection.

Summarizing the above disadvantages of providing a time interval for IF measurements according to the afore described prior art, such provisions of the measurement time interval will result in a decreased quality of service (e.g. due to loss of frames), require a complicated system modification (due to the incorporation of PN sequence generators), and will shorten the lifetime of the battery in the subscriber station MS (if the power is increased before and after the time interval). Also, the time interval is restricted by the length of the idle time in the compressed time slots.

SUMMARY OF THE INVENTION

As explained above, the above described procedures for triggering and carrying-out IF measurements in a mobile communication system are generally disadvantageous since the lifetime of the battery of the subscriber station MS is reduced (due to the specific triggering method use) and the quality of service of the data transmission is degraded (due to loss of frames) and the system configuration may become complicated (due to the incorporation of PN sequence generators). Furthermore, a long time is needed to perform a handover because the IF measurements can only be carried out in the idle time intervals during a compressed mode of operation. The present invention aims in particular at avoiding the last mentioned disadvantage.

In particular, the object of the present invention is to provide a subscriber station, a network control means, a method and a mobile communication system in which IF measurements can be facilitated while maintaining the quality of transmission.

This object is solved by a subscriber station of a mobile communication system having at least one base transceiver station and a network control means, including an inter-frequency IF measurement means adapted to perform IF measurements, characterized by a time interval signal detection means adapted to detect in a transmission from said network control means an IF measurement time interval indication signal indicating a time interval of an established connection between said subscriber station and said base transceiver station in which IF measurements are to be carried out by said subscriber station, wherein said IF measurement means is adapted to perform said IF measurements in said time interval indicated in said IF measurement time interval indication signal.

This object is also solved by a method for performing inter-frequency IF measurements in a subscriber station of a mobile communication system having at least one base transceiver station and a network control means, characterized by the steps of selecting, during a connection between said subscriber station and said base transceiver station, an IF measurement time interval in a network control means and sending from said network control means to said subscriber station an IF measurement time interval indication signal indicating said time interval of said connection in which said IF measurements are to be carried out by said subscriber station; detecting said IF measurement time interval indication signal in said subscriber station; and performing said IF measurements in said subscriber station in said time interval of said connection as indicated by said IF measurement time interval indication signal.

This object is also solved by a mobile communication system comprising at least one subscriber station including an inter-frequency IF measurement means adapted to perform IF measurements and at least one base transceiver station and a network control means for performing data transmissions with said subscriber station during a connection, characterized by said network control means comprising an IF measurement time interval selecting means adapted to select a time interval of said connection in which said subscriber station is to carry out IF measurements and adapted to send to said subscriber station an IF measurement time interval indication signal indicating said time interval; and said subscriber station comprising a time interval signal detection means adapted to detect in a transmission from said network control means said IF measurement time interval indication signal indicating said time interval, wherein said IF measurement means is adapted to perform said IF measurements in said time interval indicated in said detected IF measurement time interval indication signal.

This object is also solved by a network control means of a mobile communication system for controlling data transmissions between at least subscriber station and at least one base transceiver station on an established communication connection, characterized by said network control means comprising an IF measurement time interval selecting means adapted to select a time interval of a connection in which said subscriber station is to carry out IF measurements and adapted to send to said subscriber station an IF measurement time interval indication signal indicating said time interval.

According to a first aspect of the invention the network control means comprises an IF selection means which selects a predetermined time interval of said connection in which said subscriber station is to carry out IF measurements. This selected predetermined time interval is sent to the subscriber station in an IF measurement time interval indication signal which indicates that predetermined selected time interval to the subscriber station. The subscriber station comprises a time interval signal detection means in order to detect in a transmission from the network control means said IF measurement time interval indication signal. Thereafter, the IF measurements are carried out by the subscriber station in the predetermined time interval which has been selected in the network control means. Therefore, the network can indicate to the subscriber station when and for how long time the subscriber station shall perform measurements on another frequency. That is, the IF measurement time interval indication signal specifies the start timing as well the length of the time interval during which IF measurements are to be carried in the subscriber station. In this selected time interval the subscriber station need not worry about a possible deterioration of the transmission quality, e.g. a loss of data, since the subscriber station can rely on the network control means having provided a time interval for which the network control means has already determined that a temporary reduction of the transmission quality is acceptable or can be and will be compensated.

According to a second aspect of the invention the subscriber station and/or the base transceiver station comprise a connection quality monitoring means adapted to monitor the quality of service on an established communication connection and to transmit information of the quality of service to said network control means. In such case the network control means selects said predetermined time interval of said communication connection on the basis of said information on the quality of service reported from the connection quality monitoring means. The time interval is selected to be a time interval in which a temporary reduction of the quality of service due to said IF measurement means performing said If measurements is allowed. The advantage of such a procedure is that of course the network control means knows beforehand that the indication of the time interval to the subscriber station will invariably cause a degradation of the transmission conditions if the subscriber really carries out the IF measurements in this time interval. However, if the network control means makes sure that it indicates the time interval in which a temporary reduction of the quality is accepted, then the network control means can also make provisions precisely in this selected time interval to counterbalance this degradation of the quality.

According to a third aspect of the invention, a delay sensitive data transmission is performed between the base transceiver station and the subscriber station on said established communication connection. If during a delay-sensitive data transmission an IF measurement is carried out, this will likely imply the loss of data slots (parts of a frame) of frames on the connection, i.e. a degradation of the quality of service. However, this can be counter-balanced if the subscriber station and the network control means indicate to a power adjustment means to respectively increase a transmission power on the down-link and the up-link of the communication connection before the beginning of said predetermined time interval and/or after the end of said predetermined time interval. That is, advantageously the average error rate is kept the same despite invariably a loss of data will occur in the delay-sensitive data transmission if in a time interval IF measurements are carried out.

According to a fourth aspect of the invention a loss-sensitive data transmission is performed between the base transceiver station and the subscriber station. During a loss-sensitive type of connection service the information flow between the network and the subscriber station is usually not dense and a buffer used during that connection on the network side is below a specified threshold. In such case the network may request a subscriber station to perform measurements on other frequencies/systems in a time interval in which a transmission buffer means is not completely filed with transmission data. That is, in said selected time interval in which said IF measurements are carried out by the IF measurement means of the subscriber station, the transmission buffer in the network can temporarily store at least a portion of said transmission data to be sent during said time interval. After the end of the time interval the additionally stored data (time slots e.g. in GSM or data frames e.g. in WCDMA) are transmitted to the subscriber station, such that no loss of data at all occurs.

According to a fifth aspect of the invention, in connection with the usage of the transmission buffer means regarding the loss-sensitive type connection service, the network control means is adapted to decrease the data transmission rate during the time interval and to increase the data transmission rate again after said time interval has ended. By doing so, it is advantageously avoided that the buffer means becomes quickly filled since the rate at which data arrives is reduced.

According to a sixth aspect of the invention, in connection with the usage of the transmission buffer means according to the fourth and fifth aspects, it is possible that the network control means performs a re-scheduling with other buffer means in order to provide an increased storage capacity for the intermediate storage of transmission data. It is also possible to perform a dynamic buffer scheduling with other buffer means in order to temporarily increase the buffer size of the transmission buffer means and decrease the buffer size of other buffer means which are not used in the time interval. Only if neither the buffer re-scheduling or the dynamic buffer scheduling manages to increase the transmission buffer size, a deletion means of the network means finally deletes at least a portion of the data to be transmitted in said time interval.

According to a seventh aspect of the invention a data transmission between the base transceiver station and the subscriber station is carried out in a compressed mode of operation where a portion of the data is compressed in the time slot. The IF measurements are then preferably carried out in the time interval indicated in the IF measurement time interval indication signal as well as in a number of idle time portions of data frames where data transmission is carried out in a compressed mode. Thus, in this case the network requests the subscriber station when and for how long time the subscriber station shall perform measurements on another frequency and this can be used as a complement to compressed mode.

Further advantageous embodiments and improvements of the invention may be taken from the dependent claims. Furthermore, the invention can comprise embodiments resulting from a combination of aspects and features which have been separately described and/or claimed in the description and/or the attached claims.

Hereinafter, embodiments of the invention will be described with reference to the attached drawings.

BRIEF DESCRIPTION OF THE DRAWINGS

FIG. 3-1 shows the constitution of data frames and time slots when a compressed mode of operation is used;

FIG. 3-2 shows a flow chart similar to FIG. 2 when a compressed mode of operation is used as shown in FIG. 3-1;

FIG. 4-1 shows the provision of a field measurement time slot in a conventional TDMA mobile communication system such as GSM;

FIG. 4-2 shows a flow chart similar as in FIG. 3-2 for the case when field measurements are carried out in a specific field measurement time slot as shown in FIG. 4-1;

Figure 2:
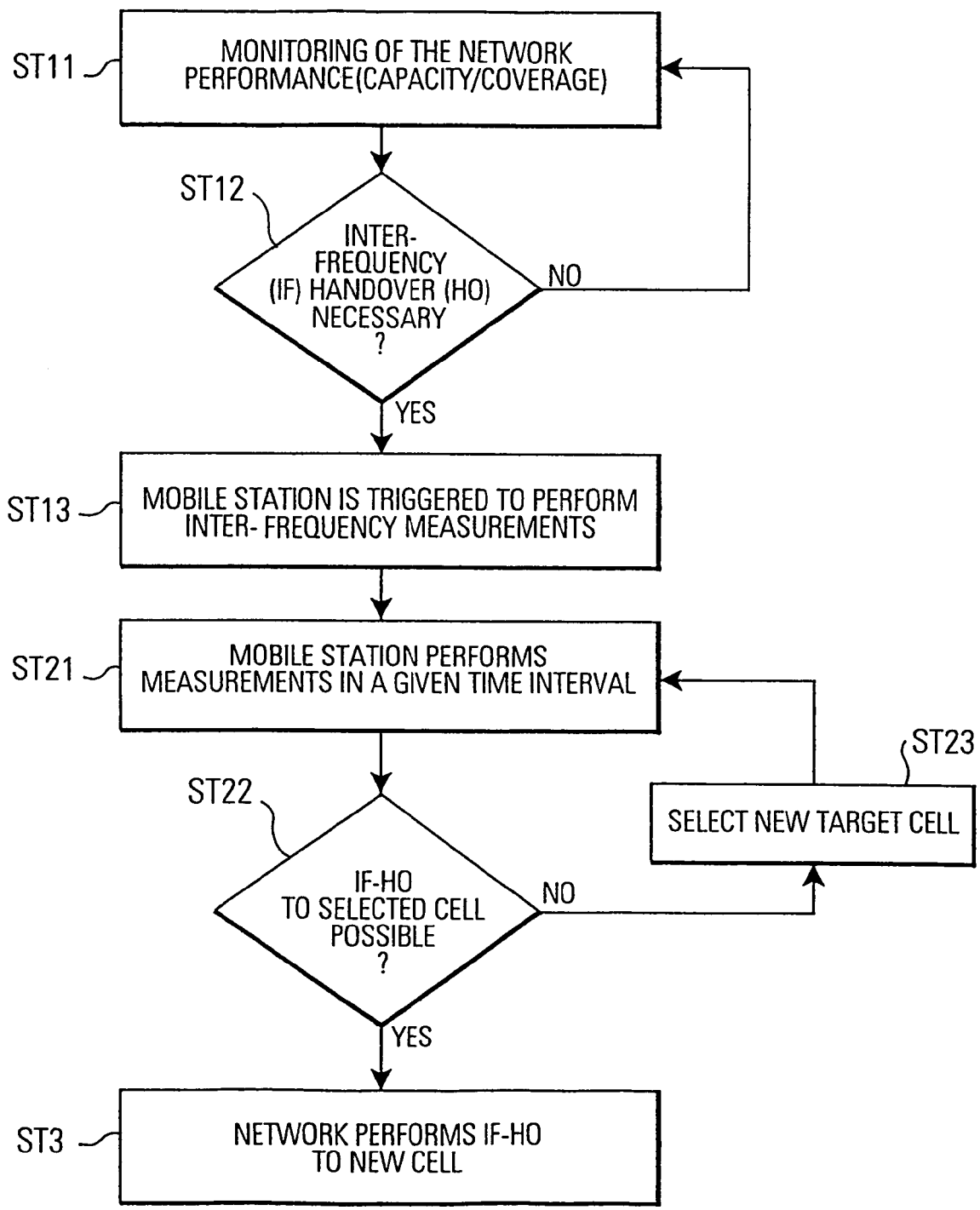
FIG. 2 shows a flow chart for performing an inter-frequency and/or inter-system handover in the telecommunication system TELE shown in FIG. 1.
Figures 1, 3:
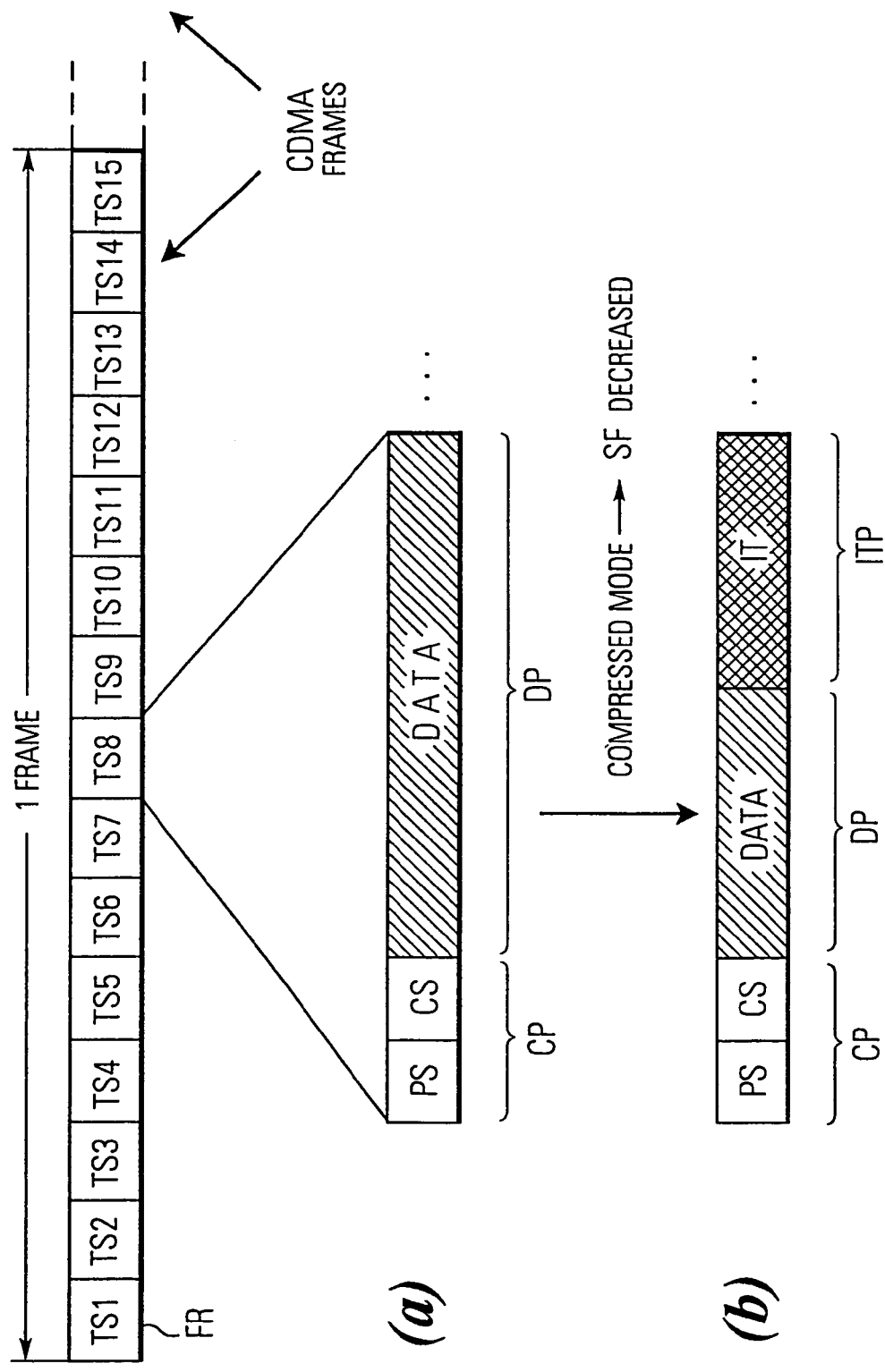
Figures 1, 4:
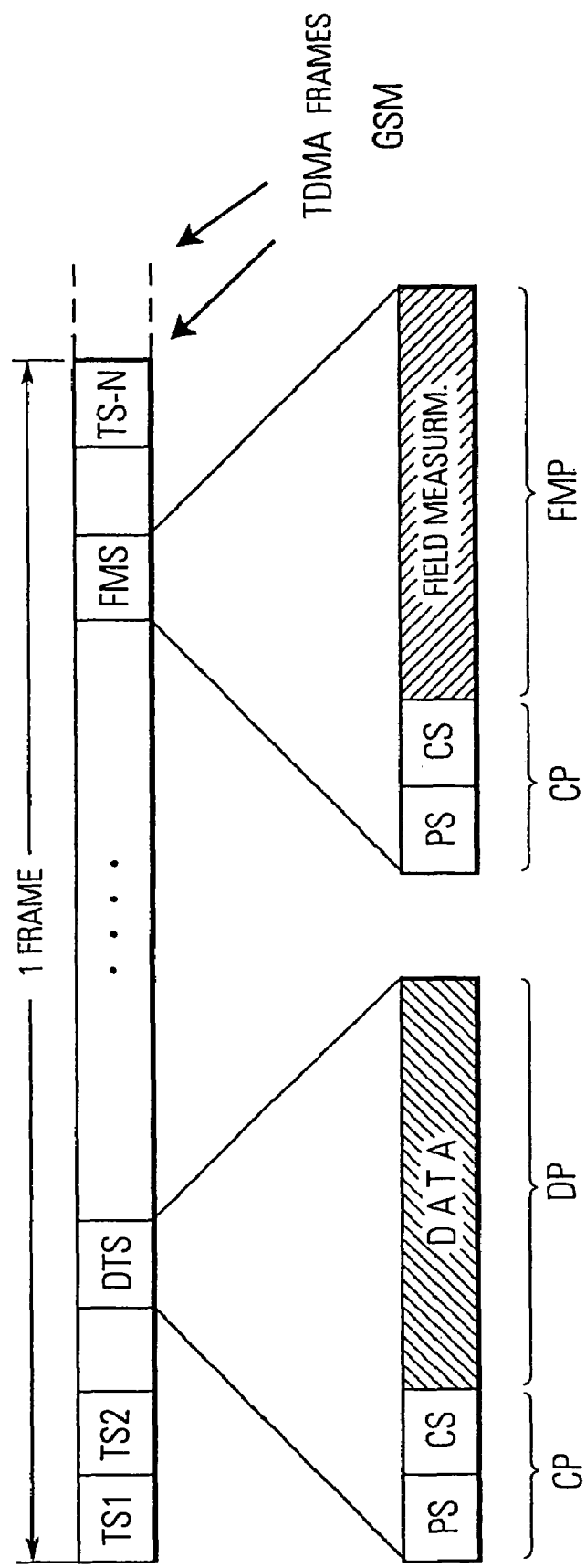
Figures 2, 4:
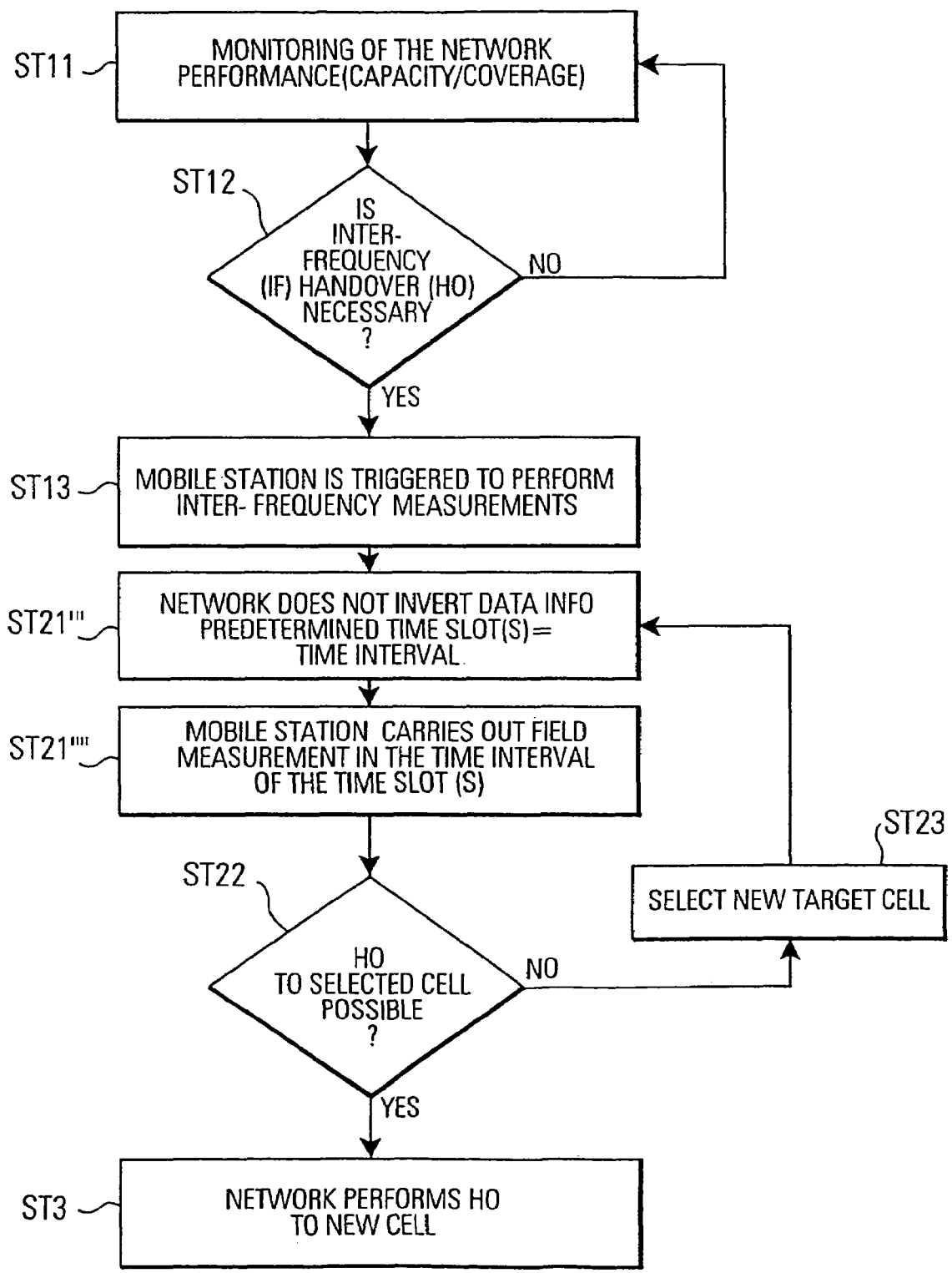

It should be noted that throughout the drawings the same or similar reference numerals designate the same or similar steps and features. In particular, the units described for a conventional subscriber station MS and a conventional network control means RNC in FIG. 2 are also present in the embodiments of the invention. Furthermore, it should be noted that the invention is not restricted to the specific CDMA, WCDMA, D-AMPS or GSM systems described above. That is, the invention can be applied to any telecommunications system where a handover needs to be performed between frequencies, cells and different systems.

DETAILED DESCRIPTION

It should be noted that handover procedures and IF measurements are carried out in both cases when a communication connection CC is set up or when merely a signaling connection has been set up with the mobile station MS in a non-active mode of operation.

Figure 1:
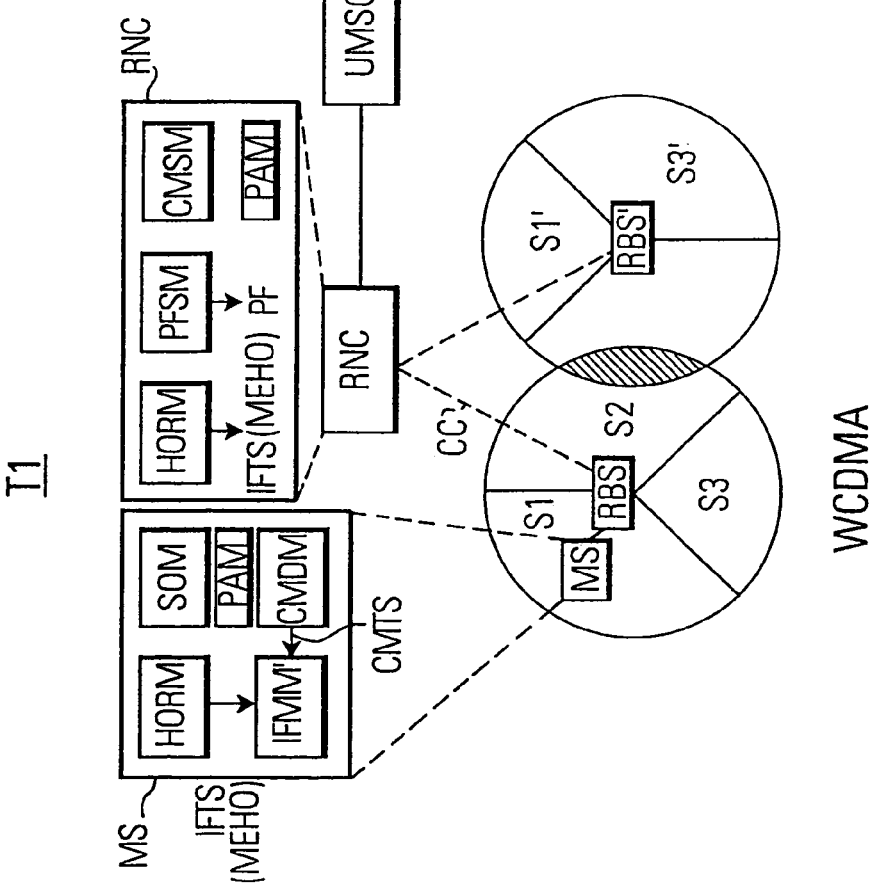
FIG. 1 shows a principal overview of a telecommunication system TELE comprising at least two different mobile communications systems T1, T2 according to the prior art.
Figure 1:
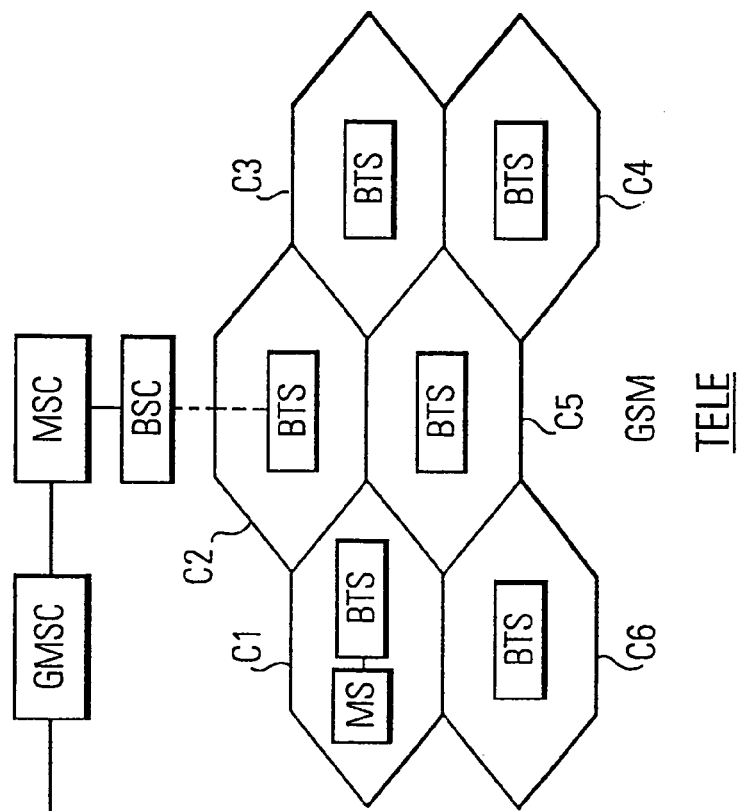
Figure 7:
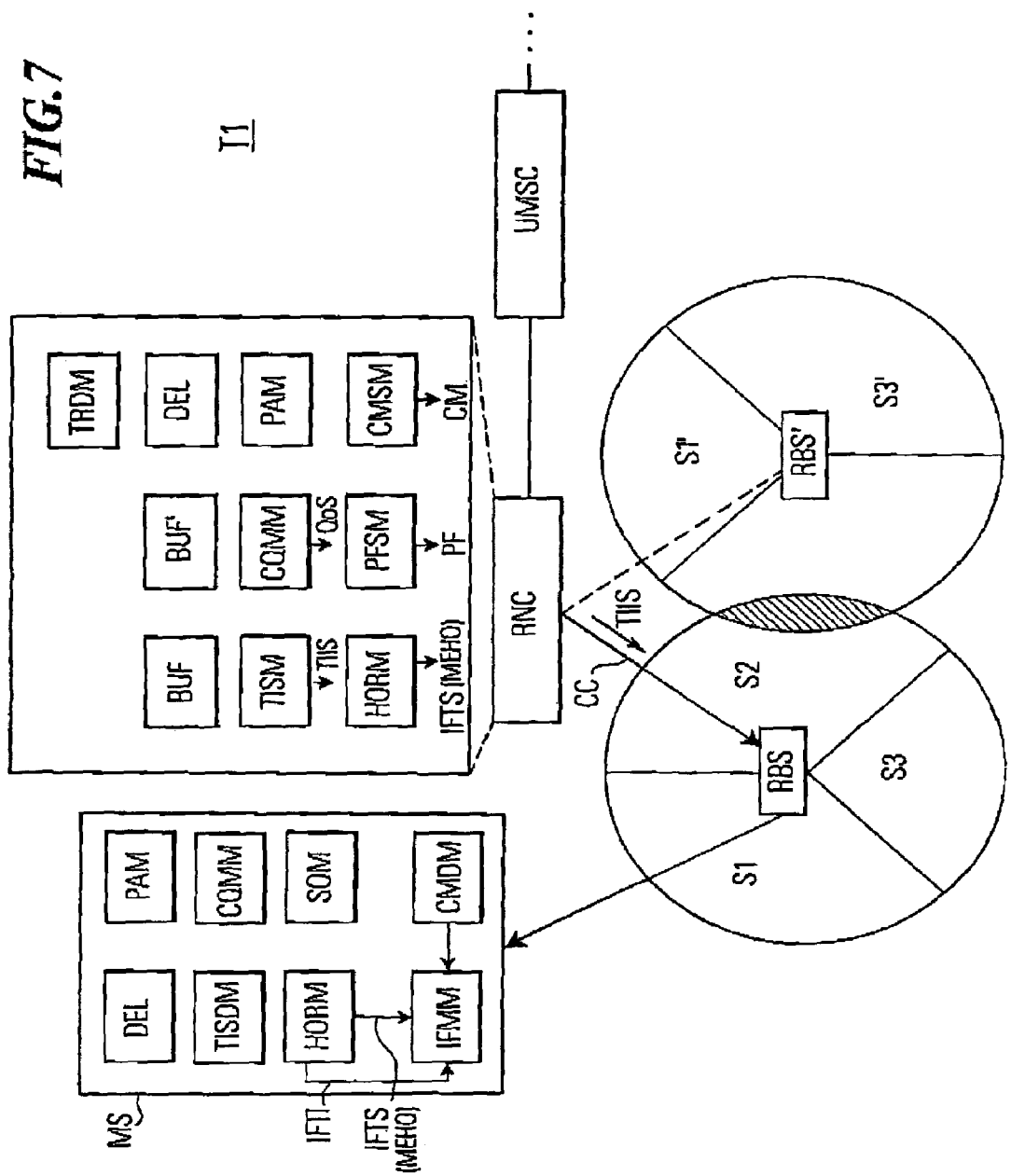
FIG. 7 shows a principle block diagram of a subscriber station MS and a network control means RNC according to the invention.

FIG. 7 shows a principle block diagram of a mobile communication system T1 according to the invention. In addition to the units already illustrated in FIG. 1 according to the prior art, the mobile station MS comprises a time interval signal detection means TISDM adapted to detect in a transmission from the network control means RNC an IF measurement time interval indication signal TIIS which indicates a predetermined time interval. The network control means RNC comprises an IF measurement time interval selection means TISM adapted to select said predetermined time interval of said connection in which said subscriber station MS is to carry out said IF measurements. As indicated in FIG. 7, the time interval selection means TISM sends to said subscriber station MS said IF measurement time interval indication signal TIIS.

Therefore, using the time interval selection means TISM in a network control means RNC and the time interval signal detection means TISDM in the subscriber station, a time interval can be specified from the network control means RNC to the subscriber station MS. Therefore, the subscriber station MS does not have to perform any determinations itself and it can entirely rely that the time interval is suitable based on the indication from the network control means.

Figure 8:
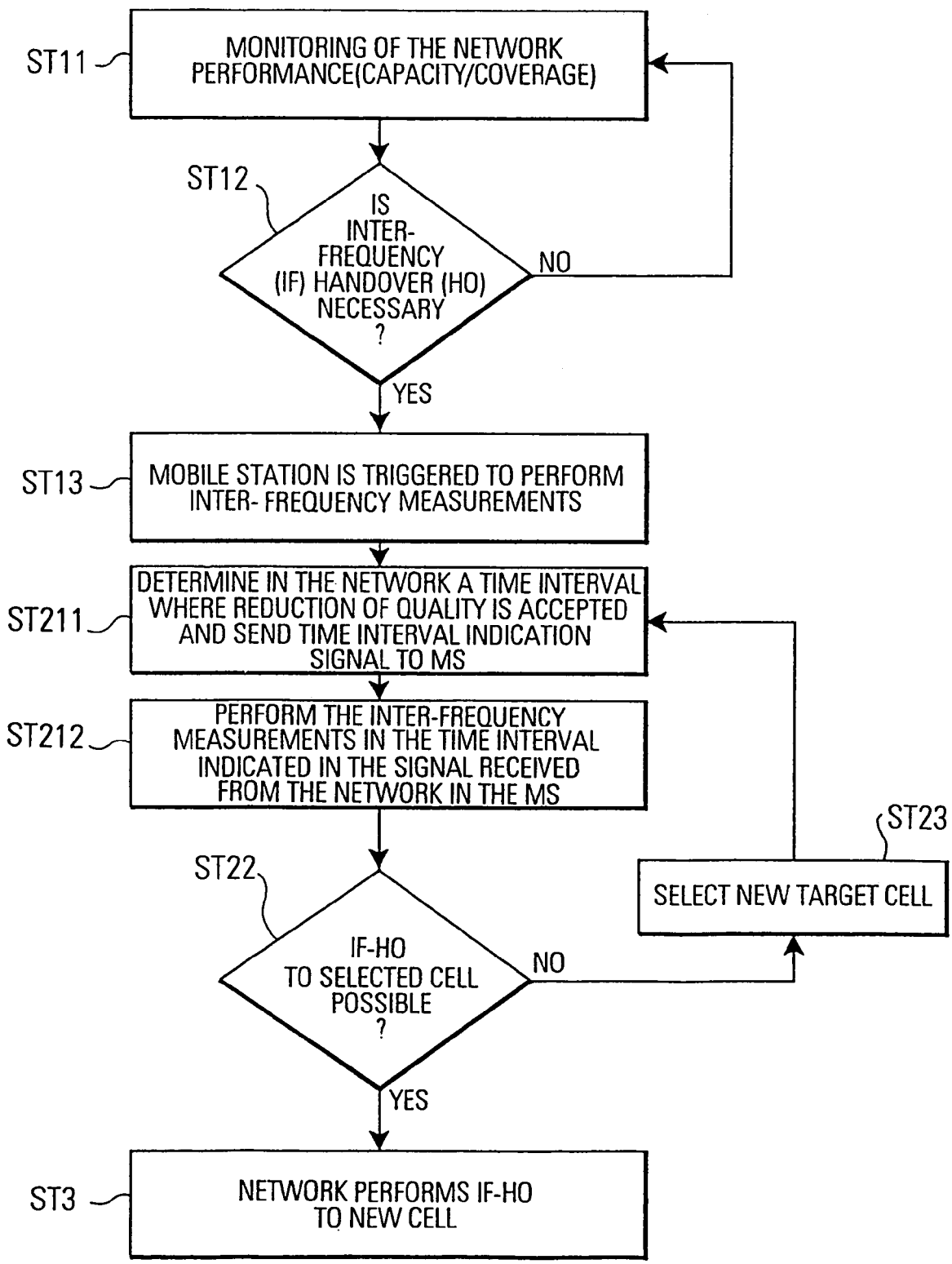
FIG. 8 shows a flow chart similar to FIG. 2 which include steps ST211, ST212 according to the principle of the invention.

As shown in FIG. 8, in principle the IF measurement means IFMM is adapted to perform said IF measurements in response to an IF measurement trigger signal IFTS which is generated by the handover means HORM in the subscriber station MS or the network control means RNC in step ST13 in FIG. 8. In step 211 the network control means RNC determines a time interval in which IF measurements are to be carried out and in which the network control means RNC determines that a temporary reduction of quality is accepted. This time interval is sent in step ST211 to the mobile station MS.

In step ST212 the IF measurement means IFMM performs said IF measurements in said predetermined time interval indicated in said detected IF measurement time interval indication signal TIIS sent from the network control means. The other steps in FIG. 8 are the same as in FIG. 2.

As explained with respect to the prior art regarding the compressed mode of operation, in a compressed mode of operation only a small idle time interval IT is available for carrying out the IF field measurements. However, according to the principle of the present invention, an intentional time interval is used in which a temporary reduction of the quality is admissible. The subscriber station—when receiving an indication of this time interval—can immediately start the IF measurements, since it can rely upon the network control means having determined a suitable time interval such that even when the IF measurements are carried out either the invariable reduction of quality is accepted or is compensated by the network control means or the subscriber station. That is, since in the time interval in which the subscriber station carries out the IF measurements no data exchange is possible between subscriber station and network, of course a temporary reduction of the quality of service occurs due to the IF measurements.

However, the network control means can autonomously determine a time interval in which such a degradation of the quality of service is not detrimental to the entire transmission. Usually, the time interval indicated by the network control means is longer than the idle time interval in the compressed mode of operation. Since the subscriber does not have to wait until a compressed mode of operation is started, the IF measurements can be carried out earlier and hence a faster inter-frequency or inter-system handover decision can be made, since the subscriber station has the ability to perform measurements when using the proposed method besides of performing measurements by using the compressed mode technique only. That is, in some situations it is crucial that the decision is made fast in order not to lose a connection and therefore, unless the quality degradation is so detrimental that the transmission is interrupted, IF measurements can still immediately be carried out thus leading to a faster handover.

Preferably, the IF measurement time interval indication signal TIIS is sent in said IF measurement trigger signal IFTS from said IF measurement time interval selection means TISM. That is, first the network control means RNC can in principle determine that there is a need for a handover and that the subscriber station need to be triggered to perform IF measurements. However, it can hold the transmission of the trigger signal until a time interval is determined in which the IF measurements are to be carried out. Then, both the trigger signal and the indication of the time interval can be sent together to the subscriber station, for example the IF measurement trigger signal can also carry the information regarding the selected time interval.

Thus, when the network has decided when and in which period (or which periods) the subscriber station shall perform measurements on another frequency within the same system or another system, the subscriber station has the ability to perform these measurements even if the quality of service (QoS) of the present service (of the present services) may temporarily be degraded.

In order to allow an appropriate determination of the time interval, a network control means RNC (and/or the subscriber station MS) can comprise a connection quality measurement means CQMM adapted to monitor the quality of service QoS on the established communication connection and to transmit information of the quality of service QoS to the network control means RNC. The connection quality monitoring means CQMM can also be arranged in a base transceiver station RBS. The connection quality measurement means CQMM provides some information on the quality of service to the time interval selection means TISM. Thus, the time interval can be selected to be a time interval in which a temporary reduction of the quality of service due to said IF measurement means IFMM performing said IF measurements is allowed.

Therefore, as explained above, if one is allowed to temporarily reduce the quality of service QoS on the communication connection, the subscriber station MS can use this degradation of service for inter-frequency measurements. The network will decide one or more time intervals in which it is allowed to reduce the quality of service QoS and where the inter-frequency measurements can be carried out. The network control means has the knowledge of the connection quality in both the up- and down-link as well as the system configuration. Therefore, the network control means has the best possibility to make a decision if, when and for how long a time the subscriber station MS shall perform measurements on another frequency. Of course, if the connection quality is good and there are no other frequencies or systems to perform measurements on, there is no need for the subscriber station MS to perform any handover.

Of course, the principle of the invention requires that a network control means indicates via the detected IF measurement time indication signal TIIS when and the period(s) in which the subscriber station MS shall perform inter-frequency measurements. As also explained above this information, this information can be included in the trigger signal.

The connection quality monitoring means CQMM transmits information on the quality of service to the network control means. Furthermore, it can also transmit information on the unused buffers in the network used for the connection. That is, in any communication system, there are used transmission buffers in the network in which the transmission data is temporarily stored before it is transmitted to the subscriber station. The connection quality monitoring means CQMM (situated in the subscriber station and/or the base transceiver station and/or the network control means) also has knowledge of the system configuration, such as other frequencies within the system and other systems in the area in which the subscriber has established a connection. Therefore, based on all this information the time interval selection means TISM can select the best time interval in which a temporary degradation of the transmission quality is still acceptable.

As will be explained below with reference to the embodiments of the invention, the network control means can even make provisions to counterbalance the temporary degradation of the transmission due to the IF measurements, for example the increase of the power at the beginning or the end of the time interval. Alternatively, the transmission buffer size can be adjusted (by increasing the buffer size or using additional buffer) and furthermore, the transmission rate can be decreased in the predetermined time interval such that a smaller amount of data arrives and needs to be stored in the transmission buffers.

First Embodiment of the Invention

In general, in a communication system one can distinguish different types of services, i.e. delay-sensitive or loss-sensitive services. If the service type is delay-sensitive, then it is most important, to some extent, that the transmitted information will be received in time rather than it is free of errors. E.g. voice is a delay-sensitive transmission.

On the other hand, if the service-type is loss-sensitive, then it is important that the information will be received with no more errors than the decoder in the subscriber station or the network control means can correct. If a packet contains unrecoverable errors then it is interpreted as lost.

For example, web-browsing is a loss-sensitive service, since it does not matter whether the information arrives earlier or later.

The first embodiment of the invention relates to a situation how a minimizing or a reduction of the quality of service QoS can be used for inter-frequency measurements for the case of a delay-sensitive service.

If during the communication connection between the subscriber station MS and the base transceiver station RBS (or the network control means RNC respectively) a delay-sensitive transmission is performed, the subscriber station comprises a deletion means DEL for deleting the data arriving from the base transceiver station RBS during said selected time interval. Such a situation may for example occur, if the network control means RNC has requested a subscriber station MS to perform measurements on another frequency or system in a specific time and period due to some criteria (e.g. high frame error rate and/or bad measurement report by mobile station and/or low received signal strength and/or high output power from network to mobile station and/or bad signal to interference ratio SIR) and the subscriber station MS and the base transceiver station RBS have established a voice connection, i.e. a delay-sensitive service. This will likely imply a loss of slots (path of a frame) or frames on a current connection because such frames need to be deleted by the subscriber station in the time interval in which the IF measurements are carried out. In order to counterbalance this temporary degradation of the quality of service, said network control means RNC and/or said subscriber station MS each may comprise a power adjustment means PAM to respectively increase a transmission power on the down-link DL and the up-link UL on the communication connection CC before the beginning of said predetermined time interval and/or after the end of said predetermined time interval.

For example, if the network control means RNC at a predetermined point in time decides that 10 data frames later said subscriber station MS is to carry out IF measurements, it can send an indication signal to the subscriber MS (for example in a procedure using the transmission control flag TCP) to increase the transmission power on the up-link during the next 10 data frames. Also the network control means will increase its transmission power on the down-link DL.

Figure 5:
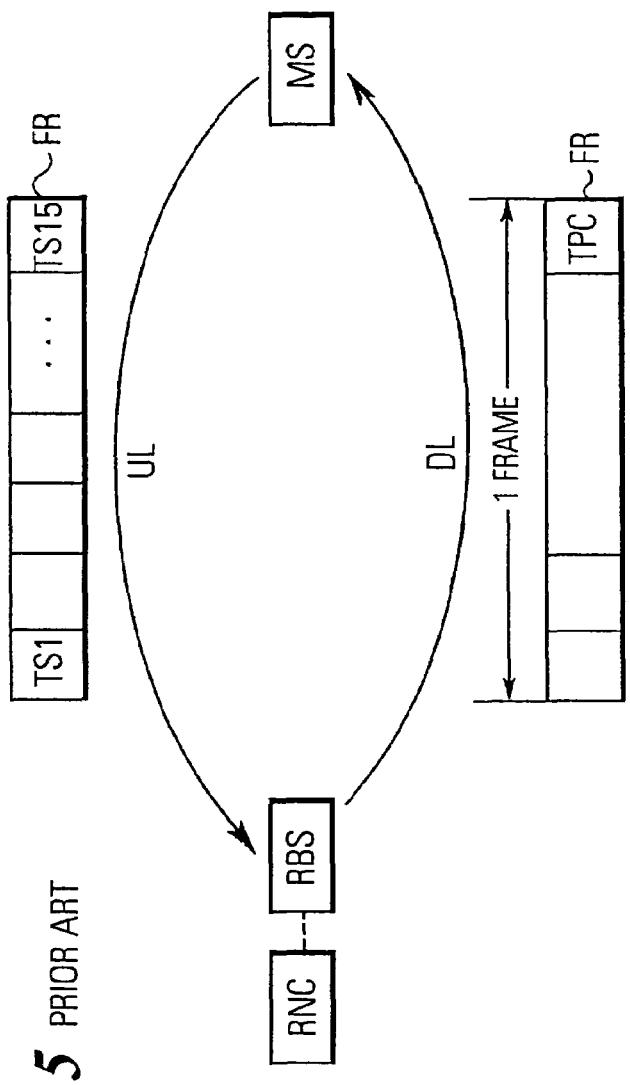
FIG. 5a shows a diagram illustrating a power adjustment procedure between a subscriber station MS and a node B (base transceiver station RBS) according to the prior art.
FIG. 5b shows the stepwise adjustment of the output power on the downlink DL.
FIG. 5c shows a slow power control and a fast power control resulting in the stepwise change of the output power in FIG. 5b.
FIG. 5d shows the mapping of a measured frame error rate FER or block error rate BLER to a delta_SIR_target value.
Figure 5:
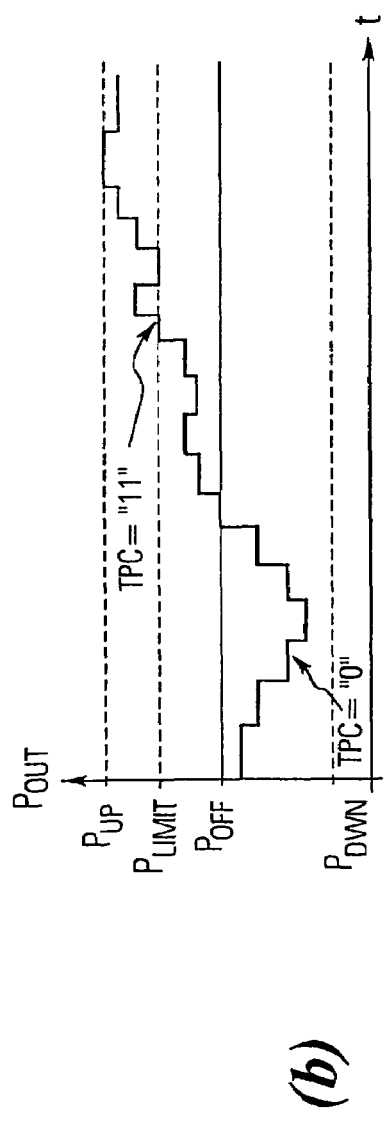
Figure 5C:
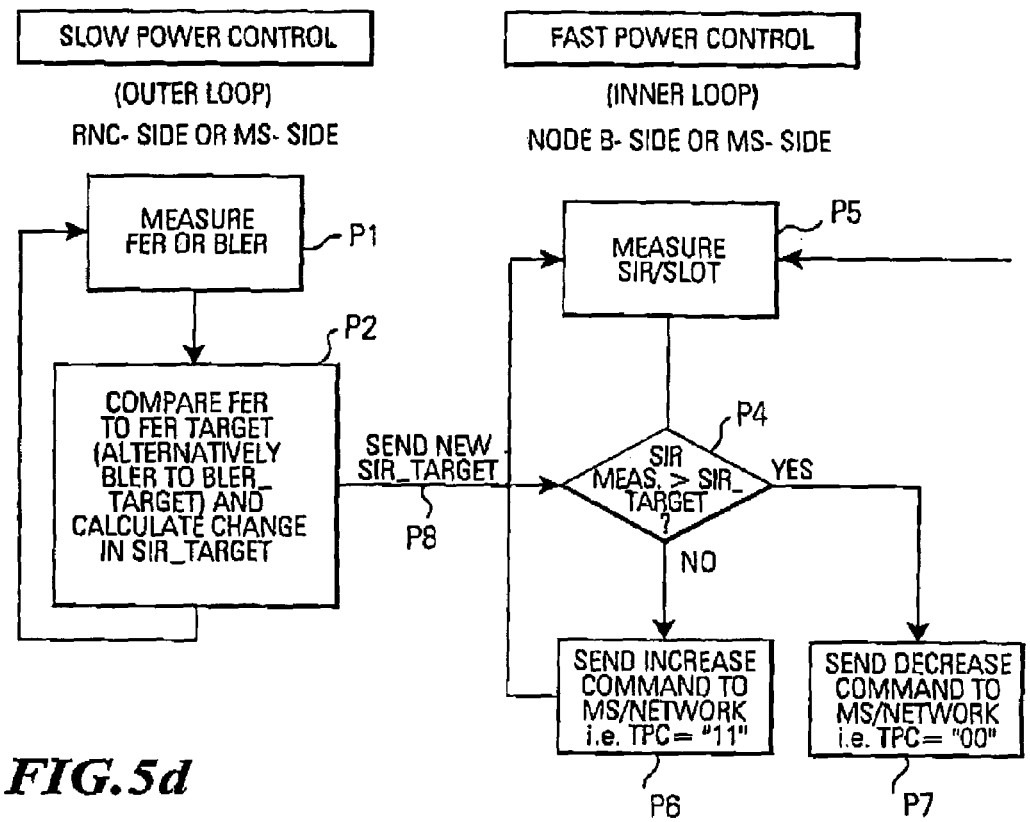
Figure 5D:
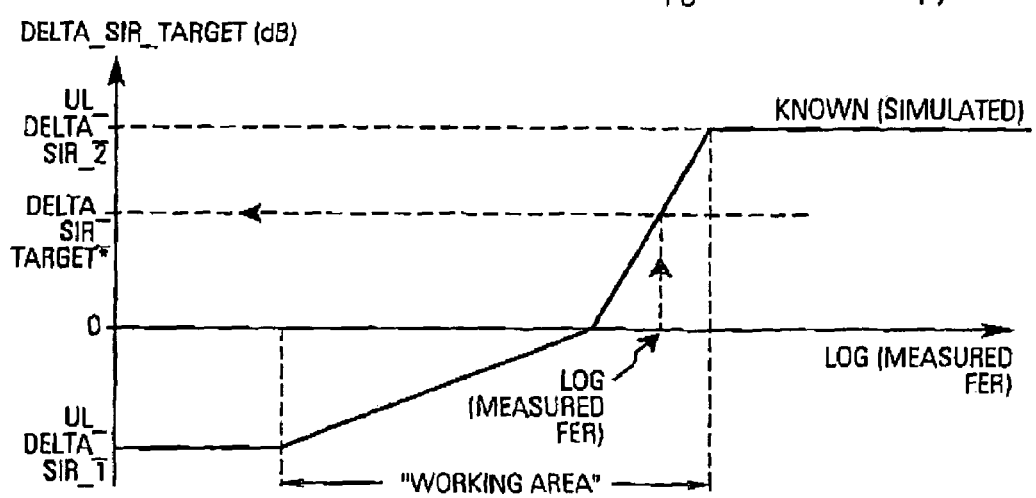
Figure 6:
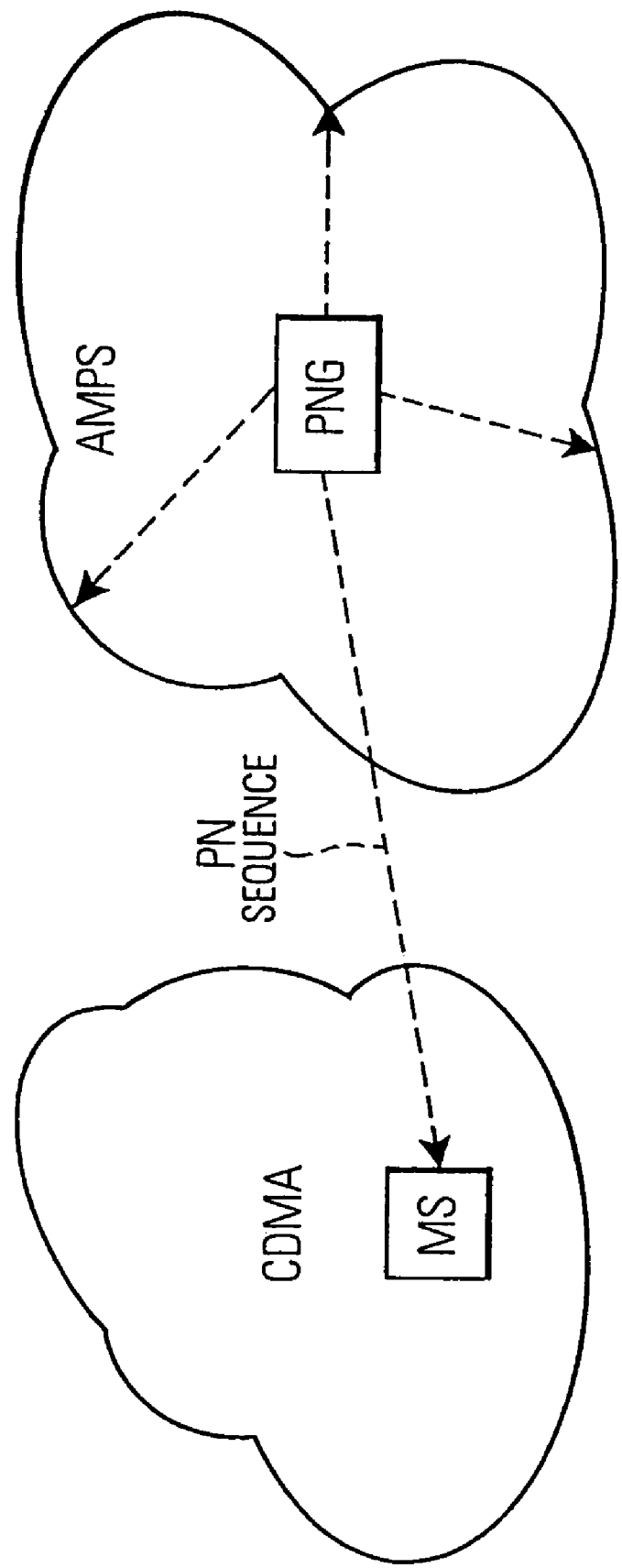
FIG. 6 shows a diagram for illustrating a handover procedure in connection with the transmission of PN sequences from a PN sequence generator PNG for inter-system handovers.

Simultaneously, the network control means will indicate to the subscriber station MS to increase its transmission power for a number of data frames (e.g. 10) after the end of the indicated time interval. Likewise, when the time interval has ended, the network control means will also increase its transmission power on the down-link. Such power adjustments can be made in the fast and slow power control cycles as described above with reference to FIG. 5.

Of course, even if the transmission power on the up-link and on the down-link is increased before and after the time interval, there is still no data transmission or reception within the time interval, since the subscriber station MS is busy performing the IF measurements. Therefore, in principle the error rate will be increased. However, this increases of error rate be compensated by the increase of the transmission power since the error rate is only calculated over an average of many data frames. Therefore, the degradation of the transmission during the IF measurement time interval can be compensated by the increase of the transmission power at the beginning or the end of the time interval. Therefore, an overall degradation of the quality of service does not take place.

Second Embodiment of the Invention

According to the second embodiment of the invention a minimization of the reduction of the quality of service QoS can be performed for inter-frequency measurements when a loss-sensitive data transmission is performed between the base transceiver station RBS and the subscriber station MS.

As shown in FIG. 7, in the network and/or in the network control means RNC a transmission buffer means BUF of a predetermined size is always used for an intermediate storage of the transmission data before it is sent on the down-link of said communication connection. If the connection service type is loss-sensitive, the information flow between the network control means RNC and the subscriber station MS is not dense and the transmission buffer means BUF used during that connection is normally below a specific threshold. Thus, the network control means RNC can request the subscriber station MS to perform measurements on other frequencies/systems in a predetermined time interval and if the network/subscriber station transmits/receives more information during the specific time interval, the transmission buffer BUF temporarily stores at least a portion of said transmission data to be sent during that time interval. The network control means RNC sends the stored data to the subscriber station MS after said selected time interval has ended. That is, in this case the network control means or the subscriber station can use the spare buffer space of the transmission buffer means BUF for an intermediate storage of the transmission data.

Therefore, if the service is loss-sensitive, i.e. no data must be lost. The network control means simply holds back the transmission data and performs an intermediate storage in the transmission buffer means BUF, since in any case during the selected IF measurement time interval no data transmission between subscriber station and network control means (base transceiver station) makes sense.

Alternatively, the temporary reduction of the quality of service during the predetermined time interval can be compensated by changing the transmission rates before and after the time interval. That is, a transmission buffer means BUF of a predetermined size for the intermediate storage of said transmission data, before it is sent on the down-link DL of said communication connection, is used, wherein in said time interval in which said IF measurements are carried out by said IF measurement means IFMM, the network control means RNC and/or the subscriber station MS decreases the data transmission rate and increases the data transmission rate again after said time interval has ended. A rate varying means in the network control means RNC takes care of the changing of the transmission rate of the service for the communication connections.

Alternatively, a case may occur where the network control means (or the base transceiver station RBS) transmits/receives more transmission data that can be handled (stored) intermediately in the current transmission buffer means BUF. In such case the network control means may perform a re-scheduling of buffer sizes with another additional transmission buffer means BUF'. That is, the network control means RNC is adapted to perform a re-scheduling with other buffer means BUF' to provide an increased storage capacity for the intermediate storage of transmission data which cannot be transmitted/received to/from the subscriber station during the selected time interval. That is, the additional buffer means BUF' will also be used for storing of transmission data which must not be lost during the time interval used for performing the IF measurements.

Furthermore, it is also possible that the network control means RNC performs a dynamic buffer scheduling with another buffer means BUF' in order to increase the buffer size of said transmission buffer means BUF and to decrease the buffer size of the other buffer means BUF' in the time interval. That is, several buffer means BUF, BUF' which are not used during said time interval can be used for an intermediate storage of data. Therefore, no data gets lost and can be transmitted to the subscriber station/base transceiver station after the time interval has ended.

It may also be the case, that the network/subscriber station may discard data in order to cope with high peaks of data flow. That is, if all storage capacity of all buffer means BUF, BUF' are fully exhausted, then there is no other option than to delete at least a portion of the data to be transmitted in said time interval. Therefore, the subscriber station MS and/or the network control means RNC comprise a deletion means for deleting at least a portion of the data to be transmitted.

Of course, the buffer sizes of the network control means/subscriber station must be below a specific threshold before this network may have the ability to order the subscribed station MS to perform measurements on another frequency/system. That is, in a case where the normally used transmission buffer is already filled, there is no chance to further hold transmission data which cannot be sent during the predetermined time interval. Even if the buffer sizes are below the predetermined threshold, there may be such a sudden increase in the data amount, that there will be an overflow of the buffer in the network. In such a case, the dynamic allocation of spare buffer space must be performed with the additional buffer means BUF'. This is impossible, since the network control means RNC knows to which extent each buffer is filled and can therefore reallocate the sizes of the buffers as needed.

As explained above, according to the first and second embodiment of the invention the network control means RNC selects a predetermined time interval in which as such a degradation of the quality of service of the communication connection will be performed because said subscriber station will carry out the IF measurements and no data transmission/reception is possible between the subscriber station and the network.

However, since the network control means knows when the time interval occurs, it can make provisions to increase the overall quality of service again. This can be done in the case of delay-sensitive data transmissions (first embodiment) as well as loss-sensitive data transmissions (second embodiment). That is, the increase of the transmission power before and after an inter-frequency measurement period in order to suppress the degradation of the quality of service QoS, the dynamic buffer reallocation and the rate varying procedures are all used to increase—on the average—the quality of service despite the fact that the IF measurements are carried out in a prolonged time interval.

Hereinafter, a third embodiment of the invention will be described in which a flow control management is performed.

Third Embodiment of the Invention

According to a third embodiment of the invention the network control means does not use an increase of the power or a reallocation or a rate varying mechanism in order to maintain the quality of service at an acceptable level.

According to the third embodiment of the invention the IF handover means HORM communicates with a transmission ratio determining means TRDM adapted to determine the ratio between transmitted and received data frames RF and the measurement time it took for this. When this ratio undergoes a specific level, the network has the ability to order the subscriber station MS to perform measurements on other frequencies/systems. However, this prerequisite may not be enough to give the order to perform measurements to the subscriber station MS.

For example, when the ratio undergoes a specific level, the network can safely assume that the data transmission rate is so low that the currently used buffer transmission means BUF will always be capable to temporarily (in the time interval) store the data which needs to be transmitted after the end of the time interval. The network control means RNC can also combine this with the dynamic buffer allocation. For example, when the network control means RNC detects that the transmission ratio (and/or reception ratio) exceeds a predetermined threshold, this may invariably indicate that the currently used transmission buffer means will not be capable to temporarily store all the transmission data in a predetermined time interval. Therefore, as soon as the network control means RNC detects.

The network control means may also combine this with the change of the transmission rates within the time interval. Even if a large transmission/reception ratio is present, the network control means RNC may first decide to reduce the data transmission rate in the time interval and if this is still not enough to store all the data temporarily in the buffer means, a rescheduling with other buffer means can additionally be used.

Therefore, in case of loss-sensitive data transmission the network control means can also always perform compensation for data frames which cannot be sent during the time interval and which may thus decrease the quality of service.

Fourth Embodiment of the Invention

According to a fourth embodiment of the invention a time interval in which the IF measurements can be selected is determined according to the principle of the invention and/or according to the first, second and third embodiments. That is, a time interval is prespecified by the network control means and is sent to the subscriber station MS. The temporary degradation of the quality of service is compensated by provisions made in the subscriber station and the network control means (differently in case of loss-sensitive or delay-sensitive data transmissions).

In accordance with the fourth embodiment of the invention, a data transmission between the base transceiver station RBS and the subscriber station MS can be carried out by transmitting data frames PR in a compressed mode of operation. As explained above, in the compressed mode of operation the data is compressed in the time slots and a compressed mode determining means CMDM in the subscriber station MS can detect this compressed mode of operation. In the fourth embodiment of the invention IF measurements can be carried out in a number of time slots (or data frames) indicated by the IF measurement time interval indication signal TIIS as well as a number of idle time portions of data frames where data transmission is carried out in a compressed mode. That is, according to the fourth embodiment of the invention the network informs the subscriber station MS when and for how long time it shall perform measurements on another frequency and this is used as a complement to compressed mode.

That is, after detection of a compressed mode of operation, first the IF measurements are carried out in the idle time portions and subsequently the IF measurements are continued in a predetermined time interval as indicated from the network control means RNC. This can also be carried out the other way around, i.e. first the IF measurements are started in the predetermined time interval and—as soon as the compressed mode of operation is detected—the idle time periods are used additionally or instead of the time interval.

In the worst case, if despite the increase of power (first embodiment), the buffer space allocation or rescheduling and rate adaption (second embodiment) and the transmission ratio determination (third embodiment) there is not enough buffer space in the network to temporarily hold the transmission data, all buffers in the network will be filled and the additional excess data will be discarded in the network. However, normally the buffers are not completely filled and only a small amount of data will have to be discarded which consequently only leads to a small degradation of the quality of service which cannot be compensated again.

INDUSTRIAL APPLICABILITY

As explained above, the above described techniques according to the principle of the invention and the first to fourth embodiments circumvent the disadvantage in the prior art that degradation of the quality of service must be accepted in a compressed mode of operation. That is, in the mobile communication system according to the present invention, an intentional degradation of the quality of service is accepted, however, since it is known in the network when this occurs, provisions can be made such that the quality of service degradation can be compensated. Therefore, the degradation of quality of service does not occur.

Such a procedure can be used in any communication system and is not restricted to any specific standard. Therefore, the present invention can be used in a GSM, in a WCDMA or a CDMA system. Furthermore, the invention is not restricted to the specific examples and embodiments as subscribed in the present specification. A skilled person can devise further embodiments, modifications and variations of the invention on the basis of the teachings disclosed herein.

The embodiment described above only constitute the preferred mode of the invention as presently conceived by the inventors.

Furthermore, as explained above, the invention can comprise embodiments consisting of features which have been separately described in the specification and/or separately claimed in the claims.

Reference numerals in the claims only serve clarification purposes and do not limit the scope of protection.

What is claimed is:

1. A subscriber station of a mobile communication system having at least one base transceiver station and a network control means, including an inter-frequency measurement means adapted to perform IF measurements, comprising:
   a time interval signal detection means adapted to detect in a transmission from said network control means an IF measurement time interval indication signal indicating a time interval of an established connection between said subscriber station and said base transceiver station in which IF measurements are to be carried out by said subscriber station, wherein said IF measurement means is adapted to perform said IF measurements in said time interval indicated in said IF measurement time interval indication signal.

2. A subscriber station according to claim 1, wherein said IF measurement means is adapted to carry out said IF measurements over the entire time interval indicated by the IF measurement time interval indication signal.

3. A subscriber station according to claim 1, wherein said IF measurement means is adapted to start performing said IF measurements in said time interval in response to an IF measurement trigger signal.

4. A subscriber station according to claim 3, wherein said IF measurement time interval indication signal is contained in said IF measurement trigger signal.

5. A subscriber station according to claim 3, wherein said IF measurement trigger signal is generated by an IF handover means when said IF handover means determines that transmission conditions in said mobile communication system necessitate an IF handover of said subscriber station.

6. A subscriber station according to claim 3, wherein IF handover means is located in a network control means of said mobile communication system and is adapted to transmit said IF measurement trigger signal to said subscriber station via a base transceiver station in response to determining a network-evaluated handover.

7. A subscriber station according to claim 3, wherein IF handover means is located in said subscriber station and is adapted to output said IF measurement trigger signal in response to determining a mobile-evaluated handover.

8. A subscriber station according to claim 1, wherein said subscriber station comprises a connection quality monitoring means adapted to monitor the quality of service on the established communication connection and to transmit information of the quality of service to said network control means.

9. A subscriber station according to claim 1, wherein during said connection a delay-sensitive data transmission is performed between said base transceiver station and said subscriber station, wherein said subscriber station comprises a deletion means for deleting the data arriving from said base transceiver station during said time interval and a power adjustment means to increase a transmission power on the up-link on the communication connection before the beginning of said time interval and/or after the end of said time interval.

10. A subscriber station according to claim 1, wherein during said connection a loss-sensitive and/or delay-sensitive data transmission is performed between said base transceiver station and said subscriber station.

11. A subscriber station according to claim 1, wherein a data transmission between said subscriber station and said base transceiver station is carried out via a transmission of data frames including a data portion and a control portion, wherein said data transmission between said subscriber station and said base transceiver station is carried out in a compressed mode by compression of transmission data in said data portion in at least one time slot such that an idle time interval is provided in said time slot where no data transmission occurs, wherein said subscriber station contains a compression-mode determining means for determining data transmission in said compressed mode and wherein said time interval corresponds to a number of data frames indicated in said IF measurement time interval indication signal and a number of idle time intervals of data frames where data transmission is carried in a compressed mode.

12. A subscriber station according to claim 1, wherein said IF measurement means also carries out measurements in an additional time interval where a data transmission takes place from said base transceiver station wherein said subscriber station contains a deletion means for deleting the data which arrives in said additional time interval.

13. A method for performing inter-frequency measurements in a subscriber station of a mobile communication system having at least one base transceiver station and a network control means, comprising the steps of selecting, during a connection between said subscriber station and said base transceiver station, an IF measurement time interval in a network control means and sending from said network control means to said subscriber station an IF measurement time interval indication signal indicating said time interval of said connection in which said IF measurements are to be carried out by said subscriber station; detecting said IF measurement time interval indication signal in said subscriber station; and performing said IF measurements in said subscriber station in said time interval of said connection as indicated by said IF measurement time interval indication signal.

14. A method according to claim 13,
   wherein said IF measurements are carried out over the entire time interval indicated by the IF measurement time interval indication signal.

15. A method according to claim 13,
   wherein said IF measurements are performed in response to an IF measurement trigger signal.

16. A method according to claim 15,
wherein said IF measurement time interval indication signal is sent in said IF measurement trigger signal.

17. A method according to claim 15,
including the steps of determining wherein transmission conditions in said mobile communication system necessitate an IF handover of said subscriber station and generating said IF measurement trigger signal when it is determined that an IF handover is necessary.

18. A method according to claim 17,
wherein said determining step whether transmission conditions in said mobile communication system necessitate an IF handover of said subscriber station is carried out by an IF handover request means located in a network control means of said mobile communication system and said IF measurement trigger signal is transmitted to said subscriber station via a base transceiver station in response to determining a network-evaluated handover.

19. A method according to claim 17,
wherein said determining whether transmission conditions in said mobile communication system necessitate an IF handover of said subscriber station and said generation of said IF measurement trigger signal is carried out by an IF handover request means located in said subscriber station in response to determining a mobile-evaluated handover.

20. A method according to claim 13,
wherein in said subscriber station the quality of service on an established communication connection is monitored and information of the quality of service is transmitted to said network control means.

21. A method according to claim 13,
wherein in said base transceiver station the quality of service on an established communication connection is monitored and information of the quality of service is transmitted to said network control means.

22. A method for performing inter-frequency measurements in a subscriber station of a mobile communication system having at least one base transceiver station and a network control means, comprising the steps of selecting, during a connection between said subscriber station and said base transceiver station, an IF measurement time interval in a network control means and sending from said network control means to said subscriber station an IF measurement time interval indication signal indicating said time interval of said connection in which said IF measurements are to be carried out by said subscriber station; detecting said IF measurement time interval indication signal in said subscriber station; and performing said IF measurements in said subscriber station in said time interval of said connection as indicated by said IF measurement time interval indication signal; and
wherein in said subscriber station the quality of service on an established communication connection is monitored and information of the quality of service is transmitted to said network control means; and
wherein said time interval of said communication connection is selected on the basis of said information on the quality of service, wherein said time interval is selected to be a time interval in which a temporary reduction of the quality of service due to said IF measurement means performing said IF measurements is allowed.

23. A method according to claim 20, wherein said time interval of said communication connection is selected on the basis of said information on the quality of service, wherein said time interval is selected to be a time interval in which a temporary reduction of the quality of service due to said IF measurement means performing said IF measurements is allowed.

24. A method according to claim 13,
wherein during said connection a delay-sensitive data transmission is performed between said base transceiver station and said subscriber station, wherein data arriving from said base transceiver station during said time interval is deleted and a transmission power on the down-link and the up-link on the communication connection before the beginning of said time interval and/or after the end of said time interval is increased.

25. A method according to claim 13,
wherein during said connection a loss-sensitive data transmission is performed between said base transceiver station and said subscriber station, wherein said transmission data before it is sent on the down-link of said communication connection is temporarily stored in a transmission buffer means having a predetermined size in said network control means, wherein in said time interval in which said IF measurements are carried out by said IF measurement means, said transmission buffer temporarily stores at least a portion of said transmission data to be sent during said time interval and said network control means sends said stored data to the subscriber station after said time interval has ended.

26. A method according to claim 13,
wherein during said connection a loss-sensitive data transmission is performed between said base transceiver station and said subscriber station, wherein said network control means comprises a transmission buffer means of a predetermined size for intermediate storage of said transmission data before it is sent on the down-link of said communication connection, wherein in said time interval in which said IF measurements are carried out by said IF measurement means, said network control means decreases the data transmission rate and increases the data transmission rate again after said time interval has ended.

27. A method according to claim 26,
wherein if in the time interval the data amount to be transmitted is larger than the predetermined size of said buffer means, the network control means performs a re-scheduling with other buffer means to provide an increased storage capacity for the intermediate storage of transmission data.

28. A method according to claim 26,
wherein if in the time interval the data amount to be transmitted is larger than the predetermined size of the buffer means, said network control means is adapted to perform a dynamic buffer scheduling with other buffer means in order to increase the buffer size of said buffer means and decrease the buffer size of said other buffers means in the time interval.

29. A method according to claim 26,
wherein if in the time interval the data amount to be transmitted is larger than the predetermined size of said buffer means, a deletion means of said network control means deletes at least a portion of the data to be transmitted in said time interval.

30. A method according to claim 29,
wherein said IF handover request means comprises a transmission ratio determining means adapted to determine the ratio between transmitted and received data frames and the measurement time, said IF handover request means outputs said IF measurement trigger signal when said transmission/reception ratio is lower than a predetermined ratio.

31. A method according to claim 13,
wherein a data transmission between said base transceiver stations and said subscriber station is carried out by transmitting data frames including a control portion and a data portion, wherein in a compressed mode of operation data in said data portion in at least one time slot of a data frame is compressed in said network control means such that an idle time interval is provided in said time slot where no data transmission occurs, wherein a data transmission in said compressed mode is detected in said subscriber station and wherein said time interval corresponds to a number of data frames indicated in said IF measurement time interval indication signal as well as a number of idle time intervals of data frames where data transmission is carried in a compressed mode.

32. A method according to claim 13,
wherein said IF measurements are also carried out in an additional time interval where a data transmission takes place from said base transceiver station wherein the data which arrives in said additional time interval from said network control means is discarded in said subscriber station.

33. A mobile communication system including at least one subscriber station including an inter-frequency measurement means adapted to perform IF measurements, at least one base transceiver station, and a network control means for performing data transmissions with said subscriber station during a connection, wherein said network control means comprises an IF measurement time interval selecting means adapted to select a time interval of said connection in which said subscriber station is to carry out IF measurements and adapted to send to said subscriber station an IF measurement time interval indication signal indicating said time interval; and said subscriber station comprising a time interval signal detection means adapted to detect in a transmission from said network control means said IF measurement time interval indication signal indicating said time interval, wherein said IF measurement means is adapted to perform said IF measurements in said time interval indicated in said detected IF measurement time interval indication signal.

34. A system according to claim 33,
wherein said IF measurement means is adapted to carry out said IF measurements over the entire time interval.

35. A system according to claim 34,
wherein said IF measurement means is adapted to perform said IF measurements in response to an IF measurement trigger signal.

36. A system according to claim 33,
further including an IF handover request means adapted to determine whether transmission conditions in said mobile communication system necessitate an IF handover of said subscriber station and to generate said IF measurement trigger signal when it is determined that an IF handover is necessary.

37. A system according to claim 36,
wherein said IF handover request means is located in said subscriber station and said IF measurement trigger signal is generated in response to determining a mobile-evaluated handover.

38. A system according to claim 33,
wherein said subscriber station comprises a connection quality monitoring means adapted to monitor the quality of service on the established communication connection and to transmit information of the quality of service to said network control means.

39. A system according to claim 33,
wherein said base transceiver station comprises a connection quality monitoring means adapted to monitor the quality of service on the established communication connection and to transmit information of the quality of service to said network control means.

40. A system according to claim 38,
wherein said IF measurement time interval selecting means selects said time interval of said communication connection on the basis of said information on the quality of service, wherein said time interval is selected to be a time interval i:n which a temporary reduction of the quality of service due to said IF measurement means performing said IF measurements is allowed.

41. A system according to claim 40,
wherein during said communication connection a delay-sensitive data transmission is performed between said base transceiver station and said subscriber station, wherein said subscriber station comprises a deletion means for deleting the data arriving from said base transceiver station during said time interval and said network control means and said subscriber station each comprise a power adjustment means to respectively increase a transmission power on the down-link and the up-link on the communication connection before the beginning of said time interval and/or after the end of said time interval.

42. A system according to claim 33,
wherein said loss-sensitive data transmission is a data transmission during a web-browsing.

43. A system according to claim 33,
wherein a data transmission between said base transceiver stations and said subscriber station is carried out by transmitting data frames including a control portion and a data portion, wherein said network control means comprises a compressed mode operation means adapted to compress in a compressed mode of operation data in said data portion in at least one time slot of a data frame such that an idle time interval is provided in said time slot where no data transmission occurs, wherein said subscriber station comprises a compressed mode determining means for determining a data transmission in said compressed mode and wherein said time interval corresponds to a number of data frames indicated in said IF measurement time interval indication signal as well as a number of idle time portions of data frames where data transmission is carried in a compressed mode.

44. A network control means of a mobile communication system for controlling data transmissions between at least subscriber station and at least one base transceiver station on an established connection, comprising:
said network control means comprising an IF measurement time interval selecting means adapted to select a time interval of a connection in which said subscriber station is to carry out IF measurements and adapted to send to said subscriber station an IF measurement time interval indication signal indicating said time interval.

45. A network control means according to claim 44,
wherein said network control means sends said IF measurement time interval indication signal together with an IF measurement trigger signal from said IF measurement time interval selecting means.

46. A network control means according to claim 45, including:
an IF handover request means adapted to determine whether transmission conditions in said mobile communication system necessitate an IF handover of said subscriber station and to generate said IF measurement trigger signal when it is determined that an IF handover is necessary.

47. A network control means according to claim 44, wherein said IF measurement time interval selecting means selects said time interval of said communication connection on the basis of an information on the quality of service, wherein said time interval is selected to be a time interval in which a temporary reduction of the quality of service due to said IF measurement means performing said IF measurements is allowed.

48. A network control means according to claim 46, wherein during said communication connection a delay-sensitive data transmission is performed between said base transceiver station and said subscriber station, wherein said network control means comprises a power adjustment means to respectively increase a transmission power on the down-link on the communication connection before the beginning of said time interval and/or after the end of said time interval.

49. A network control means according to claim 47, wherein during a communication connection a loss-sensitive data transmission is performed between said base transceiver station and said subscriber station, wherein said network control means comprises a transmission buffer means of a predetermined size for intermediate storage of said transmission data before it is sent on the down-link of said communication connection, wherein in said time interval in which said IF measurements are carried out by said IF measurement means (IFMM), said transmission buffer temporarily stores at least a portion of said transmission data to be sent during said time interval and said network control means sends said stored data to the subscriber station after said time interval has ended.

50. A network control means according to claim 47, wherein during a communication connection a loss-sensitive data transmission is performed between said base transceiver station and said subscriber station, wherein said network control means comprises a transmission buffer means of a predetermined size for intermediate storage of said transmission data before it is sent on the down-link of said communication connection, wherein in said time interval in which said IF measurements are carried out by said IF measurement means, said network control means decreases the data transmission rate and increases the data transmission rate again after said time interval has ended.

51. A network control means according to claim 49, wherein, if in the time interval the data amount to be transmitted is larger than the predetermined size of said buffer means, the network control means is adapted to perform a re-scheduling with other buffer means to provide an increased storage capacity for the intermediate storage of transmission data.

52. A network control means according to claim 49, wherein if in the time interval the data amount to be transmitted is larger than the predetermined size of the buffer means, said network control means is adapted to perform a dynamic buffer scheduling with other buffer means in order to increase the buffer size of said buffer means and decrease the buffer size of said other buffers means in the time interval.

53. A network control means according to claim 49, wherein, if in the time interval the data amount to be transmitted is larger than the predetermined size of said buffer means, a deletion means of said network control means deletes at least a portion of the data to be transmitted in said time interval.

54. A network control means according to claim 46, wherein said IF handover request means comprises a transmission ratio determining means adapted to determine a ratio between transmitted and received data frames and the measurement time, said IF handover request means outputs said IF measurement trigger signal when said transmission/reception ratio is lower than a predetermined ratio.

55. A mobile communication system comprising at least one base transceiver station, a network control means, and at least one subscriber station,
the network control means comprising an IF measurement time interval selecting means adapted to select a time interval of a connection in which said at least one subscriber station is to carry out IF measurements and adapted to send to said at least one subscriber station an IF measurement time interval indication signal indicating said time interval;
the at least one subscriber station comprising an inter-frequency (P) measurement means (IFMM) adapted to perform IF measurements and a time interval signal detection means adapted to detect in a transmission from said network control means the IF measurement time interval indication signal indicating the time interval of the connection between said at least one subscriber station and said base transceiver station in which IF measurements are to be carried out by said at least one subscriber station, wherein said IF measurement means is adapted to perform said IF measurements in said time interval indicated in said IF measurement time interval indication signal.

56. A subscriber station of a mobile communication system having at least one base transceiver station and a network control means, including an inter-frequency measurement means adapted to perform IF measurements, comprising:
a time interval signal detection means adapted to detect in a transmission from said network control means an IF measurement time interval indication signal indicating a time interval of an established connection between said subscriber station and said base transceiver station in which IF measurements are to be carried out by said subscriber station, wherein said IF measurement means is adapted to perform said IF measurements in said time interval indicated in said IF measurement time interval indication signal; and wherein during said connection a delay-sensitive data transmission is performed between said base transceiver station and said subscriber station, wherein said subscriber station comprises a deletion means for deleting the data arriving from said base transceiver station during said time interval and a power adjustment means to increase a transmission power on the up-link on the communication connection before the beginning of said time interval and/or after the end of said time interval.

57. A method for performing inter-frequency measurements in a subscriber station of a mobile communication system having at least one base transceiver station and a network control means, comprising the steps of selecting, during a connection between said subscriber station and said base transceiver station, an IF measurement time interval in a network control means and sending from said network control means to said subscriber station an IF measurement time interval indication signal indicating said time interval of said connection in which said IF measurements are to be carried out by said subscriber station; detecting said IF measurement time interval indication signal in said subscriber station; and performing said IF measurements in said subscriber station in said time interval of said connection as indicated by said IF measurement time interval indication signal; and wherein during said connection a delay-sensitive data transmission is performed between said base transceiver station and said subscriber station, wherein data arriving from said base transceiver station during said time interval is deleted and a transmission power on the down-link and the up-link on the communication connection before the beginning of said time interval and/or after the end of said time interval is increased.

58. A method for performing inter-frequency measurements in a subscriber station of a mobile communication system having at least one base transceiver station and a network control means, comprising the steps of selecting, during a connection between said subscriber station and said base transceiver station, an IF measurement time interval in a network control means and sending from said network control ens to said subscriber station an IF measurement time interval indication signal indicating said time interval of said connection in which said IF measurements are to be carried out by said subscriber station; detecting said IF measurement time interval indication signal in said subscriber station; and performing said IF measurements in said subscriber station in said time interval of said connection as indicated by said IF measurement time interval indication signal; and wherein during said connection a loss-sensitive data transmission is performed between said base transceiver station and said subscriber station, wherein said transmission data before it is sent on the down-link of said communication connection is temporarily stored in a transmission buffer means having a predetermined size in said network control means, wherein in said time interval in which said IF measurements are carried out by said IF measurement means, said transmission buffer temporarily stores at least a portion of said transmission data to be sent during said time interval and said network control means sends said stored data to the subscriber station after said time interval has ended.

59. A method for performing inter-frequency measurements in a subscriber station of a mobile communication system having at least one base transceiver station and a network control means, comprising the steps of selecting, during a connection between said subscriber station and said base transceiver station, an IF measurement time interval in a network control means and sending from said network control means to said subscriber station an IF measurement time interval indication signal indicating said time interval of said connection in which said IF measurements are to be carried out by said subscriber station; detecting said IF measurement time interval indication signal in said subscriber station; and performing said IF measurements in said subscriber station in said time interval of said connection as indicated by said IF measurement time interval indication signal; and wherein during said connection a loss-sensitive data transmission is performed between said base transceiver station and said subscriber station, wherein said network control means comprises a transmission buffer means of a predetermined size for intermediate storage of said transmission data before it is sent on the down-link of said communication connection, wherein in said time interval in which said IF measurements are carried out by said IF measurement means, said network control means decreases the data transmission rate and increases the data transmission rate again after said time interval has ended.

60. A method for performing inter-frequency measurements in a subscriber station of a mobile communication system having at least one base transceiver station and a network control means, comprising the steps of selecting, during a connection between said subscriber station and said base transceiver station, an IF measurement time interval in a network control means and sending from said network control means to said subscriber station an IF measurement time interval indication signal indicating said time interval of said connection in which said IF measurements are to be carried out by said subscriber station; detecting said IF measurement time interval indication signal in said subscriber station; and performing said IF measurements in said subscriber station in said time interval of said connection as indicated by said IF measurement time interval indication signal; and wherein during said connection a loss-sensitive data transmission is performed between said base transceiver station and said subscriber station, wherein said network control means comprises a transmission buffer means of a predetermined size for intermediate storage of said transmission data before it is sent on the down-link of said communication connection, wherein in said time interval in which said IF measurements are carried out by IF measurement means (IFMM), said network control means decreases the data transmission rate and increases the data transmission rate again after said time interval has ended; and wherein if in the time interval the data amount to be transmitted is larger than the predetermined size of said buffer means, a deletion means of said network control means deletes at least a portion of the data to be transmitted in said time interval; and wherein IF handover request means comprises a transmission ratio determining means adapted to determine the ratio between transmitted and received data frames and the measurement time, said IF handover request means outputs an IF measurement trigger signal when said transmission/reception ratio is lower than a predetermined ratio.

\* \* \* \* \*